US012792107B2

(12) United States Patent
Shi et al.

(10) Patent No.: US 12,792,107 B2
(45) Date of Patent: Nov. 10, 2026

(54) HINGE MECHANISM AND ELECTRONIC DEVICE

(71) Applicant: Huawei Technologies Co., Ltd., Shenzhen (CN)

(72) Inventors: Tuo Shi, Shanghai (CN); Yong Liu, Dongguan (CN); Ding Zhong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 19/022,465

(22) Filed: Jan. 15, 2025

(65) Prior Publication Data

US 2025/0155937 A1 May 15, 2025

Related U.S. Application Data

(63) Continuation of application No. PCT/CN2024/079692, filed on Mar. 1, 2024.

(30) Foreign Application Priority Data

Jun. 20, 2023 (CN) ......................... 202310739114.7

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
None
See application file for complete search history.

(56) References Cited

U.S. PATENT DOCUMENTS

| | | | | |
|---|---|---|---|---|
| 9,801,290 | B2 * | 10/2017 | Ahn | G06F 1/1652 |
| 10,394,062 | B1 * | 8/2019 | Song | G02F 1/133308 |
| 2019/0174645 | A1 * | 6/2019 | Jeon | G06F 1/1641 |
| 2020/0103935 | A1 * | 4/2020 | Hsu | G06F 1/1681 |
| 2020/0267859 | A1 * | 8/2020 | Kim | G06F 1/1641 |
| 2021/0247814 | A1 * | 8/2021 | Nguyen | G06F 1/1652 |
| 2021/0247815 | A1 * | 8/2021 | Shim | G06F 1/1616 |
| 2021/0267077 | A1 * | 8/2021 | Zhang | H05K 5/0221 |
| 2022/0217859 | A1 * | 7/2022 | Lee | G06F 1/1652 |
| 2022/0236774 | A1 * | 7/2022 | Kim | G06F 1/1652 |
| 2023/0007797 | A1 * | 1/2023 | Jiang | G09F 9/301 |

(Continued)

FOREIGN PATENT DOCUMENTS

CN 110784567 A 2/2020

*Primary Examiner* — Xanthia C Relford
(74) *Attorney, Agent, or Firm* — Conley Rose, P.C.

(57) ABSTRACT

A hinge mechanism includes a base, a first housing fastening bracket, a second housing fastening bracket, and a support assembly. The support assembly includes a first support part, a second support part, and a third support part. The first support part is disposed at an end part of the first housing fastening bracket, and the first support part is provided with a first protrusion and a first groove. The second support part is disposed at an end part of the second housing fastening bracket, and the second support part is provided with a second protrusion and a second groove. The third support part is disposed at an end part of the base, and a fourth protrusion and a fourth groove are disposed on a side that is of the third support part and that is proximate to the second housing fastening bracket.

20 Claims, 12 Drawing Sheets

(56) References Cited

U.S. PATENT DOCUMENTS

| | | | | |
|---|---|---|---|---|
| 2023/0032983 | A1* | 2/2023 | Feng | F16C 11/04 |
| 2023/0136116 | A1* | 5/2023 | Kim | F16C 11/10<br>361/807 |

* cited by examiner

HINGE MECHANISM AND ELECTRONIC DEVICE

CROSS-REFERENCE TO RELATED APPLICATIONS

This is a continuation of International Patent Application No. PCT/CN2024/079692 filed on Mar. 1, 2024, which claims priority to Chinese Patent Application No. 202310739114.7 filed on Jun. 20, 2023, all of which are hereby incorporated by reference in their entireties.

TECHNICAL FIELD

This disclosure relates to the field of electronic device technologies, and in particular, to a hinge mechanism and an electronic device.

BACKGROUND

Gradual maturation of flexible display technologies drives a display manner of an electronic device to greatly change. A mobile phone with a foldable flexible display, a tablet computer with a foldable flexible display, a wearable electronic device with a foldable flexible display, and the like are an important evolution direction of intelligent electronic devices in the future.

A hinge mechanism is a key component for implementing a folding function of a foldable electronic device, and reliability of the hinge mechanism is highly important to overall reliability of the electronic device. The hinge mechanism generally includes a plurality of mechanical parts that is in a transmission connection, and the electronic device is closed or unfolded through joint actions between the plurality of mechanical parts. However, when a condition such as falling or collision occurs on the electronic device, the mechanical part of the hinge mechanism is prone to be misplaced during a shock. As a result, not only strength of the mechanical part is damaged, but also another component of the electronic device is pulled. This severely affects the reliability of the electronic device.

SUMMARY

This disclosure provides a hinge mechanism and an electronic device, to improve structural reliability of the hinge mechanism, and further improve overall reliability of the electronic device.

According to a first aspect, this disclosure provides a hinge mechanism. The hinge mechanism may include a main shaft assembly, a first housing fastening bracket, a second housing fastening bracket, and a support assembly. The first housing fastening bracket and the second housing fastening bracket are respectively disposed on two sides of the main shaft assembly, and the first housing fastening bracket and the second housing fastening bracket are capable of separately rotating relative to the main shaft assembly. The support assembly includes a first support part, a second support part, and a third support part. The first support part may be disposed at an end part of the first housing fastening bracket in an axial direction of the hinge mechanism, the first support part is located on a side that is of the first housing fastening bracket and that is close to the main shaft assembly, and the first support part is provided with a first protrusion and a first groove. The second support part may be disposed at an end part of the second housing fastening bracket in the axial direction of the hinge mechanism, the second support part is located on a side that is of the second housing fastening bracket and that is close to the main shaft assembly, and the second support part is provided with a second protrusion and a second groove. The third support part may be disposed at an end part of the main shaft assembly in the axial direction of the hinge mechanism, a third protrusion and a third groove may be disposed on a side that is of the third support part and that is close to the first housing fastening bracket, and a fourth protrusion and a fourth groove may be disposed on a side that is of the third support part and that is close to the second housing fastening bracket. When the hinge mechanism is in an unfolded state, the third protrusion may be limited in the first groove, and the fourth protrusion may be limited in the second groove, and when the hinge mechanism is in a closed state, the first protrusion may be limited in the third groove, and the second protrusion may be limited in the fourth groove. Alternatively, when the hinge mechanism is in an unfolded state, the first protrusion may be limited in the third groove, and the second protrusion may be limited in the fourth groove, and when the hinge mechanism is in a closed state, the third protrusion may be limited in the first groove, and the fourth protrusion may be limited in the second groove.

In this disclosure, when the hinge mechanism is in the unfolded state, at least horizontal positioning can be implemented on the first support part, the second support part, and the third support part through fitting between the third protrusion and the first groove and fitting between the fourth protrusion and the second groove, or through fitting between the first protrusion and the third groove and fitting between the second protrusion and the fourth groove. In this way, a risk that the first support part and the second support part are horizontally displaced can be reduced, and a risk that the first housing fastening bracket and the second housing fastening bracket are misplaced relative to the base when the hinge mechanism is in the unfolded state can be further reduced. Similarly, when the hinge mechanism is in the closed state, at least horizontal positioning can be implemented on the first support part, the second support part, and the third support part through fitting between the first protrusion and the third groove and fitting between the second protrusion and the fourth groove, or through fitting between the third protrusion and the first groove and fitting between the fourth protrusion and the second groove. In this way, a risk that the first support part and the second support part are horizontally displaced can be reduced, and a risk that the first housing fastening bracket and the second housing fastening bracket are misplaced relative to the base when the hinge mechanism is in the closed state can be further reduced.

Based on the foregoing hinge mechanism in this disclosure, in a process in which the electronic device changes from the unfolded state to the closed state, when the first housing fastening bracket and the second housing fastening bracket move in a direction close to each other, and the first housing fastening bracket drives the first swing arm to rotate around the main shaft assembly in a clockwise direction, the first swing arm may drive the first connector to move toward the first swing arm in the first track slot of the main shaft assembly, to drive the first support arm to rotate around the main shaft assembly in a counterclockwise direction, and when the second housing fastening bracket drives the second swing arm to rotate around the main shaft assembly in a counterclockwise direction, the second swing arm may drive the second connector to move toward the second swing arm in the second track slot of the main shaft assembly, to drive the second support arm to rotate around the main shaft assembly in a clockwise direction. In a process in which the electronic device changes from the closed state to the unfolded state, when the first housing fastening bracket and the second housing fastening bracket move in a direction away from each other, and the first housing fastening bracket drives the first swing arm to rotate around the main shaft assembly in a counterclockwise direction, the first swing arm may drive the first connector to move toward the first support arm in the first track slot of the main shaft assembly, to drive the first support arm to rotate around the main shaft assembly in a clockwise direction, and when the second housing fastening bracket drives the second swing arm to rotate around the main shaft assembly in a clockwise direction, the second swing arm may drive the second connector to move toward the second support arm in the second track slot of the main shaft assembly, to drive the second support arm to rotate around the main shaft assembly in a counterclockwise direction. In this way, folding and unfolding functions of the hinge mechanism can be implemented.

It should be understood that, in this disclosure, a fitting surface between a groove and a protrusion is not a plane. Fitting between the third protrusion and the first groove is used as an example. When the third protrusion is limited in the first groove, it may be obtained that the first groove surrounds or partially surrounds the third protrusion, and a contact surface between the first groove and the third protrusion is a curved surface including a plurality of planes facing different directions. Correspondingly, the contact surface between the third protrusion and the first groove also includes the plurality of planes facing different directions, and each plane of the third protrusion abuts each plane of the first groove, to limit the first support part in the plurality of directions including a horizontal direction. In this way, degrees of freedom of the first support part in the plurality of directions can be effectively limited, that is, degrees of freedom of the first housing fastening bracket in the plurality of directions can be limited. However, a hinge mechanism usually does not have a related support structure, and when an electronic device in which the hinge mechanism is used falls or collides, a housing fastening bracket of the electronic device is easily displaced relative to a main shaft assembly. As a result, misplacement occurs. The hinge mechanism provided in this embodiment of this disclosure uses fitting between a protrusion and a groove, so that regardless of whether an electronic device in which the hinge mechanism is used is in an unfolded device or a closed state, a risk that a housing fastening bracket is misplaced relative to a main shaft assembly when the electronic device falls or collides can be effectively reduced, and a structural stability of the hinge mechanism can be improved.

In some implementation solutions, the first plane is defined as a plane perpendicular to the axial direction of the hinge mechanism, and a projection of the third support part on the first plane may cover a projection of the main shaft assembly on the first plane. In other words, a circumferential edge of the third support part exceeds the main shaft assembly. In this way, there is sufficient space in the third support part to arrange protrusions and grooves on two sides of the third support part, and it is also convenient to implement fitting between the first support part and the second support part.

In some implementation solutions, the third support part may include a main body and a baffle plate, the third protrusion, the third groove, the fourth protrusion, and the fourth groove may all be disposed on the main body, and the baffle plate may be located on a side that is of the main body and that is away from the main shaft assembly. Similarly, the first plane is defined as a plane perpendicular to the axial direction of the hinge mechanism. When the hinge mechanism is in the unfolded state and the closed state, a projection of the baffle plate on the first plane may cover at least of a projection of the first support part on the first plane and at least a part of a projection of the second support part on the first plane. This design can implement positioning on the first support part and the second support part in the axial direction, reduce a risk that the first support part and the second support part are misplaced in the axial direction, and further reduce a risk that the first housing fastening bracket and the second housing fastening bracket are misplaced relative to the main shaft assembly in the axial direction.

In a specific implementation, the main body and the baffle plate of the third support part may be of an integrated structure, to improve structural strength of the third support part, and reduce assembly difficulty of the hinge mechanism.

In some implementation solutions, a groove wall of the first groove may include a first concave curved surface, and a surface of the third protrusion may include a third convex curved surface whose shape is consistent with that of the first concave curved surface. This can increase adaptation between the surface of the third protrusion and the groove wall of the first groove can be increased, and reduce or avoid a risk that the third protrusion moves in the first groove. Similarly, a groove wall of the second groove includes a second concave curved surface, and a surface of the fourth protrusion includes a fourth convex curved surface whose shape is consistent with that of the second concave curved surface. This can increase adaptation between the surface of the fourth protrusion and the groove wall of the second groove, and reduce or avoid a risk that the fourth protrusion moves in the second groove.

For example, the first concave curved surface may include a first inclined surface, the third convex curved surface may include a third inclined surface, and in a direction that points from the third protrusion to the fourth protrusion, the third inclined surface of the third convex curved surface may gradually tilt in a direction away from a support surface of the main shaft assembly, and the second concave curved surface may include a second inclined surface, the fourth convex curved surface may include a fourth inclined surface, and in a direction that points from the fourth protrusion to the third protrusion, the fourth inclined surface of the fourth convex curved surface gradually tilts in a direction away from the support surface of the main shaft assembly. When the hinge mechanism is in the unfolded state, the third protrusion is limited in the first groove, the third inclined surface of the third convex curved surface is parallel to and abuts the first inclined surface of the first concave curved surface, and the fourth inclined surface of the fourth convex curved surface is parallel to and abuts the second inclined surface of the second concave curved surface.

Based on a same principle, a groove wall of the third groove may include a third concave curved surface, and a surface of the first protrusion may include a first convex curved surface whose shape is consistent with that of the third concave curved surface. This can increase adaptation between the first protrusion and the third groove, and reduce or avoid a risk that the first protrusion moves in the third groove. Similarly, a groove wall of the fourth groove may include a fourth concave curved surface, and a surface of the second protrusion may include a second convex curved surface whose shape is consistent with that of the fourth concave curved surface. This can increase adaptation between the second protrusion and the fourth groove, and reduce or avoid a risk that the second protrusion moves in the fourth groove.

For example, the first convex curved surface may include a first inclined surface, the third concave curved surface may correspondingly include a third inclined surface, and in a direction that points from the third groove to the fourth groove, the third inclined surface of the third concave curved surface may gradually tilt in a direction close to the support surface of the main shaft assembly, and the second convex curved surface may include a second inclined surface, the fourth concave curved surface may include a fourth inclined surface, and in a direction that points from the fourth groove to the third groove, the fourth inclined surface of the fourth concave curved surface may gradually tilt in a direction close to the support surface of the main shaft assembly. When the hinge mechanism is in the closed state, the first inclined surface of the first convex curved surface is parallel to and abuts the third inclined surface of the third concave curved surface, and the second inclined surface of the second convex curved surface is parallel to and abuts the fourth inclined surface of the fourth concave curved surface.

In some implementation solutions, the surface of the third protrusion may be connected to the groove wall of the third groove through a first connection arc-shaped surface, and the surface of the fourth protrusion is connected to the groove wall of the fourth groove through a second connection arc-shaped surface. In this way, when the hinge mechanism is switched from the unfolded state to the closed state or from the closed state to the unfolded state, the first connection arc-shaped surface may provide a guiding function for the first protrusion or the first groove of the first support part, and the second connection arc-shaped surface may provide a guiding function for the second protrusion or the second groove of the second support part. This can reduce a risk that the first support part and the third support part, and the second support part and the third support part are stuck, and improve smoothness of rotation of the first housing fastening bracket and the second housing fastening bracket relative to the main shaft assembly.

In some implementation solutions, the first support part and the first housing fastening bracket may be of an integrated structure, thereby improving connection strength between the first support part and the first housing fastening bracket.

Similarly, the second support part and the second housing fastening bracket may also be of an integrated structure, thereby improving connection strength between the second support part and the second housing fastening bracket. In addition, the third support part and the main shaft assembly may also be of an integrated structure, thereby improving connection strength between the third support part and the main shaft assembly.

In some implementation solutions, there may be two first support parts and two second support parts, the two first support parts are respectively disposed at two ends of the first housing fastening bracket in the axial direction of the hinge mechanism, and the two second support parts are respectively disposed at two ends of the second housing fastening bracket in the axial direction of the hinge mechanism. Correspondingly, there may also be two third support parts, and the two third support parts are respectively disposed at two ends of the main shaft assembly in the axial direction of the hinge mechanism. In this way, the support assembly can limit the first housing fastening bracket and the second housing fastening bracket at both ends of the hinge mechanism. This can further reduce a risk that the first housing fastening bracket and the second housing fastening bracket are misplaced relative to the main shaft assembly, and improve structural reliability of an electronic device in which the hinge mechanism is used in a scenario such as falling or collision.

In some implementation solutions, the hinge mechanism may further include a rotating module, and the first housing fastening bracket and the second housing fastening bracket are capable of separately rotating relative to the main shaft assembly through the rotating module. A specific implementation of the rotating module is not limited, provided that the first housing fastening bracket and the second housing fastening bracket are capable of rotating relative to the main shaft assembly, to implement folding and unfolding functions of the hinge mechanism.

For example, in a specific implementation solution, the rotating module may include a first rotating assembly and a second rotating assembly, and the first rotating assembly and the second rotating assembly are located between the first housing fastening bracket and the second housing fastening bracket. The first rotating assembly may include a first swing arm, a first support arm, and a first connector. The first swing arm is rotatably connected to the main shaft assembly, the first swing arm is slidably connected to the first housing fastening bracket, the first support arm is rotatably connected to the second housing fastening bracket, the first connector is located between the first swing arm and the first support arm, and the first connector is rotatably connected to both the first swing arm and the first support arm. The second rotating assembly may include a second swing arm, a second support arm, and a second connector. The second swing arm is rotatably connected to the main shaft assembly, the second swing arm is slidably connected to the second housing fastening bracket, the second support arm is rotatably connected to the first housing fastening bracket, the second connector is located between the second swing arm and the second support arm, and the second connector is rotatably connected to both the second swing arm and the second support arm. The main shaft assembly is provided with a first track slot and a second track slot. The first connector may move along the first track slot, to limit a movement track of the first connector by using the first track slot, and the second connector may move along the second track slot, to limit a movement track of the second connector by using the second track slot.

According to a second aspect, this disclosure further provides an electronic device. The electronic device includes a first housing, a second housing, a flexible display, and the hinge mechanism in the first aspect. The first housing and the second housing are respectively disposed on two opposite sides of the hinge mechanism, a first housing fastening bracket is fastened to the first housing, and a second housing fastening bracket is fastened to the second housing. The flexible display continuously covers the first housing, the second housing, and the hinge mechanism, and the flexible display is fastened to the first housing and the second housing. When the electronic device is in an unfolded state or a closed state, a third support part can implement concave-convex fitting with a first support part and a second support part, to limit relative positions between the first housing fastening bracket and a main shaft assembly and between the second housing fastening bracket and the main shaft assembly. This can reduce a risk that the first housing and the second housing are misplaced relative to the hinge mechanism, and improve reliability of the electronic device.

In a possible implementation of this disclosure, the main shaft assembly includes a base and a cover plate, the cover plate covers the base, the base is provided with a first arc-shaped groove, the cover plate includes a first protrusion disposed facing the first arc-shaped groove, and a gap between a surface of the first protrusion and a groove surface of the first arc-shaped groove may be used as a first track slot. In addition, a first connector may include a first arc-shaped surface and a second arc-shaped surface, and when the electronic device is in the unfolded state and the closed state, the first arc-shaped surface abuts the surface of the first protrusion, the second arc-shaped surface abuts the groove surface of the first arc-shaped groove. Therefore, the surface of the first protrusion and the groove surface of the first arc-shaped groove limit the first connector in the first track slot, so that when the hinge mechanism is in the unfolded state and the closed state, a position of the first connector is stable, and the first connector does not shake due to a gap. In this way, reliability of the hinge mechanism in the foregoing two states can be improved.

In addition, the base may be further provided with a third arc-shaped groove, the cover plate further includes a third protrusion disposed facing the third arc-shaped groove, and a gap between a surface of the third protrusion and a groove surface of the third arc-shaped groove is used as a second track slot, and a second connector includes a third arc-shaped surface and a fourth arc-shaped surface, and when the electronic device is in the unfolded state and the closed state, the third arc-shaped surface abuts the surface of the third protrusion, and the fourth arc-shaped surface abuts the groove surface of the third arc-shaped groove. Therefore, the surface of the third protrusion and the groove surface of the third arc-shaped groove limit the second connector in the second track slot, so that when the hinge mechanism is in the unfolded state and the closed state, a position of the second connector is stable, and the first connector does not shake due to a gap. In this way, reliability of the hinge mechanism in the foregoing two states can be improved.

In a possible implementation of this disclosure, in a process in which the electronic device changes from the unfolded state to the closed state, the first arc-shaped surface abuts the surface of the first protrusion, and a gap exists between the second arc-shaped surface and the groove surface of the first arc-shaped groove. However, in a process in which the electronic device changes from the closed state to the unfolded state, the second arc-shaped surface abuts the groove surface of the first arc-shaped groove, and a gap exists between the first arc-shaped surface and the surface of the first protrusion. Therefore, a movement track of the first connector in the first track slot in the process in which the electronic device changes from the unfolded state to the closed state is different from a movement track of the first connector in the first track slot in the process in which the electronic device changes from the closed state to the unfolded state. This can help improve design flexibility of the hinge mechanism.

In addition, in the process in which the electronic device changes from the unfolded state to the closed state, the third arc-shaped surface abuts the surface of the third protrusion, and a gap exists between the fourth arc-shaped surface and the groove surface of the third arc-shaped groove. In the process in which the electronic device changes from the closed state to the unfolded state, the fourth arc-shaped surface abuts the groove surface of the third arc-shaped groove, and a gap exists between the third arc-shaped surface and the surface of the third protrusion. Therefore, a movement track of the second connector in the second track slot in the process in which the electronic device changes from the unfolded state to the closed state is different from a movement track of the second connector in the second track slot in the process in which the electronic device changes from the closed state to the unfolded state. This can help improve design flexibility of the hinge mechanism.

In this disclosure, alternatively, the movement track of the first connector in the first track slot in the process in which the electronic device changes from the unfolded state to the closed state may be the same as the movement track of the first connector in the first track slot in the process in which the electronic device changes from the closed state to the unfolded state. Further, spacings between the surface of the first protrusion and the groove surface of the first arc-shaped groove are equal. In this case, the first track slot is an equal-width slot. In the process in which the electronic device changes from the unfolded state to the closed state and in the process in which the electronic device changes from the closed state to the unfolded state, the first arc-shaped surface abuts the surface of the first protrusion, and the second arc-shaped surface abuts the groove surface of the first arc-shaped groove. This can help improve stability of movement of the first connector in the first track slot. Similarly, spacings between the surface of the third protrusion and the groove surface of the third arc-shaped groove may also be equal, and the second track slot is an equal-width slot. In addition, in the process in which the electronic device changes from the unfolded state to the closed state and in the process in which the electronic device changes from the closed state to the unfolded state, the third arc-shaped surface abuts the surface of the third protrusion, and the fourth arc-shaped surface abuts the groove surface of the third arc-shaped groove. In this way, a movement track of the second connector in the second track slot in the process in which the electronic device changes from the unfolded state to the closed state is the same as a movement track of the second connector in the second track slot in the process in which the electronic device changes from the closed state to the unfolded state, thereby improving stability of movement of the second connector in the second track slot.

In a possible implementation of this disclosure, the first arc-shaped surface of the first connector may be a circular arc-shaped surface, and the second arc-shaped surface may also be a circular arc-shaped surface. In this case, a sum of the radius of the first arc-shaped surface and the radius of the second arc-shaped surface may be equal to a spacing between the surface of the first protrusion and the groove surface of the first arc-shaped groove, to improve smoothness of movement of the first connector in the first track slot.

Similarly, the third arc-shaped surface of the second connector may be a circular arc-shaped surface, and the fourth arc-shaped surface may also be a circular arc-shaped surface. In this case, a sum of a radius of the third arc-shaped surface and a radius of the fourth arc-shaped surface may be equal to a spacing between the surface of the third protrusion and the groove surface of the third arc-shaped groove, to improve smoothness of movement of the second connector in the second track slot.

According to a third aspect, this disclosure further provides an electronic device. The electronic device may include a hinge mechanism, a first housing, a second housing, and a support assembly. The hinge mechanism includes a main shaft assembly, a first housing fastening bracket, and a second housing fastening bracket. The first housing fastening bracket and the second housing fastening bracket are respectively disposed on two sides of the main shaft assembly, the first housing fastening bracket and the second housing fastening bracket are capable of separately rotating relative to the main shaft assembly, the first housing fastening bracket is fastened to the first housing, and the second housing fastening bracket is fastened to the second housing. The support assembly may include a first support part, a second support part, and a third support part. The first support part may be disposed at an end part of the first housing in an axial direction of the hinge mechanism, the first support part is located on a side that is of the first housing and that is close to the main shaft assembly, and the first support part is provided with a first protrusion and a first groove. The second support part may be disposed at an end part of the second housing in the axial direction of the hinge mechanism, the second support part is located on a side that is of the second housing and that is close to the main shaft assembly, and the second support part is provided with a second protrusion and a second groove. The third support part may be disposed at an end part of the main shaft assembly in the axial direction of the hinge mechanism, a third protrusion and a third groove may be disposed on a side that is of the third support part and that is close to the first housing, and a fourth protrusion and a fourth groove may be disposed on a side that is of the third support part and that is close to the second housing. When the hinge mechanism is in an unfolded state, the third protrusion may be limited in the first groove, and the fourth protrusion may be limited in the second groove, and when the hinge mechanism is in a closed state, the first protrusion may be limited in the third groove, and the second protrusion may be limited in the fourth groove. Alternatively, when the hinge mechanism is in an unfolded state, the first protrusion may be limited in the third groove, and the second protrusion may be limited in the fourth groove, and when the hinge mechanism is in a closed state, the third protrusion may be limited in the first groove, and the fourth protrusion may be limited in the second groove.

In this disclosure, when the electronic device is in the unfolded state, at least horizontal positioning can be implemented on the first support part, the second support part, and the third support part through fitting between the third protrusion and the first groove and fitting between the fourth protrusion and the second groove, or through fitting between the first protrusion and the third groove and fitting between the second protrusion and the fourth groove. In this way, a risk that the first support part and the second support part are horizontally displaced can be reduced, and a risk that the first housing and the second housing are misplaced relative to the base when the electronic device is in the unfolded state can be further reduced. Similarly, when the electronic device is in the closed state, at least horizontal positioning can be implemented on the first support part, the second support part, and the third support part through fitting between the first protrusion and the third groove and fitting between the second protrusion and the fourth groove, or through fitting between the third protrusion and the first groove and fitting between the fourth protrusion and the second groove. In this way, a risk that the first support part and the second support part are horizontally displaced can be reduced, and a risk that the first housing and the second housing are misplaced relative to the base when the electronic device is in the closed state can be further reduced.

It should be understood that, in this disclosure, a fitting surface between a groove and a protrusion is not a plane. Fitting between the third protrusion and the first groove is used as an example. When the third protrusion is limited in the first groove, it may be obtained that the first groove surrounds or partially surrounds the third protrusion, and a contact surface between the first groove and the third protrusion is a curved surface including a plurality of planes facing different directions. Correspondingly, the contact surface between the third protrusion and the first groove also includes the plurality of planes facing different directions, and each plane of the third protrusion abuts each plane of the first groove, to limit the first support part in the plurality of directions including a horizontal direction. In this way, degrees of freedom of the first support part in the plurality of directions can be effectively limited, that is, degrees of freedom of the first housing in the plurality of directions can be limited. However, an electronic device usually does not have a related support structure, and when the electronic device falls or collides, a housing of the electronic device is easily displaced relative to a main shaft assembly. As a result, misplacement occurs. The electronic device provided in this embodiment of this disclosure uses fitting between a protrusion and a groove, so that regardless of whether the electronic device is in the unfolded state or the closed state, a risk that a housing is misplaced relative to the main shaft assembly when the electronic device falls or collides can be effectively reduced, and structural stability of the electronic device is improved.

Figure 1:
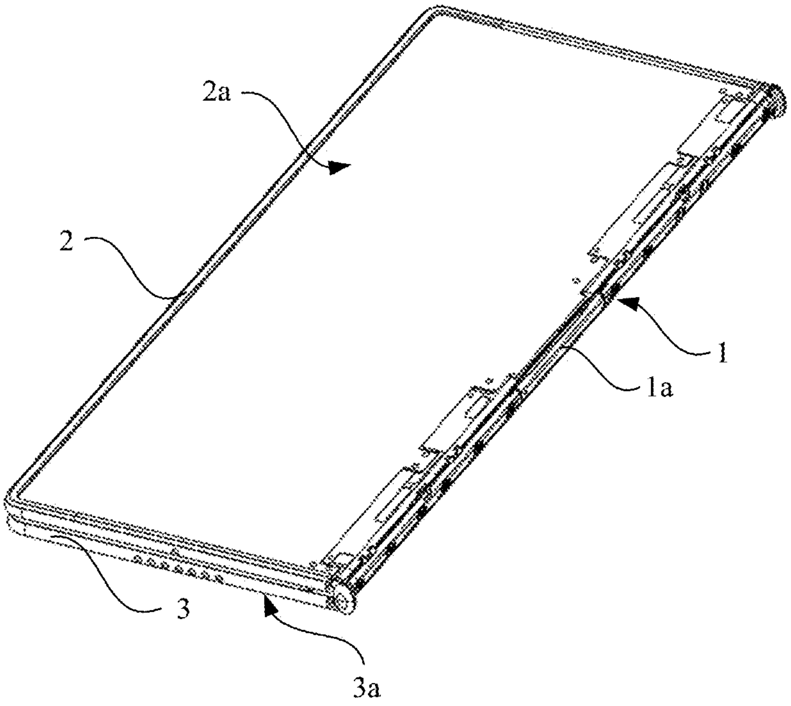
FIG. 1 is a diagram of a structure of an electronic device in a closed state according to an embodiment of this disclosure.

Reference numerals: 1: hinge mechanism; 1*a*: support surface; 1*b*: second surface of the hinge mechanism; 101: rotating module; 1011: first rotating assembly; 10111: first swing arm; 101111: first arc-shaped rotating block; 1011111: first concave part; 1011112: first mounting groove; 10111121: first circular arc-shaped surface; 10112: first support arm; 10113: first connector; 101131: first rotating shaft; 1011311: second circular arc-shaped surface; 1011312: fourth circular arc-shaped surface; 101132: second rotating shaft; 101133: first arc-shaped surface; 101134: second arc-shaped surface; 1012: second rotating assembly; 10121: second swing arm; 101211: second arc-shaped rotating block; 1012111: second concave part; 1012112: second mounting groove; 10121121: fifth circular arc-shaped surface; 10122: second support arm; 10123: second connector; 101231: third rotating shaft; 1012311: sixth circular arc-shaped surface; 1012312: eighth circular arc-shaped surface; 101232: fourth rotating shaft; 101233: third arc-shaped surface; 101234: fourth arc-shaped surface; 1013: first housing fastening bracket; 10131: first sliding slot; 10132: first mounting part; 1014: second housing fastening bracket; 10141: second sliding slot; 10142: second mounting part; 102: main shaft assembly; 1021: base; 10211: first arc-shaped groove; 102111: groove surface of the first arc-shaped groove; 10212: second arc-shaped groove; 102121: third circular arc-shaped surface; 10213: third arc-shaped groove; 102131: groove surface of the third arc-shaped groove; 10214: fourth arc-shaped groove; 102141: seventh circular arc-shaped surface; 1022: cover plate; 10221: first protruding part; 102211: surface of the first protruding part; 10222: second protruding part; 102221: surface of the second protruding part; 10223: first plug part; 10224: third protruding part; 102241: surface of the third protruding part; 10225: fourth protruding part; 102251: surface of the fourth protruding part; 1023: first track slot; 1024: second track slot; 103: support assembly; 1031: first support part; 10311: first protrusion; 103111: first convex curved surface; 1031111: first inclined surface of the first convex curved surface; 10312: first groove; 103121: first concave curved surface; 1031211: first inclined surface of the first concave curved surface; 1032: second support part; 10321: second protrusion; 103211: second convex curved surface; 1032111: second inclined surface of the second convex curved surface; 10322: second groove; 103221: second concave curved surface; 1032211: second inclined surface of the second concave curved surface; 1033: third support part; 10331: third protrusion; 103311: third convex curved surface; 1033111: third inclined surface of the third convex curved surface; 10332: third groove; 103321: third concave curved surface; 1033211: third inclined surface of the third concave curved surface; 10333: fourth protrusion; 103331: fourth convex curved surface; 1033311: fourth inclined surface of the fourth convex curved surface; 10334: fourth groove; 103341: fourth concave curved surface; 1033411: fourth inclined surface of the fourth concave curved surface; 10335: main body; 10336: baffle plate; 10337: first connection arc-shaped surface; 10338: second connection arc-shaped surface; 2: first housing; 2*a*: first surface of the first housing; 2*b*: second surface of the first housing; 3: second housing; 3*a*: second surface of the second housing; and 3*b*: second surface of the second housing.

DESCRIPTION OF EMBODIMENTS

To make objectives, technical solutions, and advantages of this disclosure clearer, the following further describes embodiments of this disclosure in detail with reference to accompanying drawings. However, example implementations may be implemented in a plurality of forms, and it should not be understood as being limited to the example implementations described herein. Same reference numerals in the accompanying drawings represent same or similar structures. Therefore, repeated descriptions thereof are omitted. Expressions of locations and directions in embodiments of this disclosure are described by using the accompanying drawings as an example. However, changes may also be made as required, and all the changes fall within the protection scope of this disclosure. The accompanying drawings in embodiments of this disclosure are merely used to show a relative position relationship, and do not represent an actual scale.

It should be noted that specific details are described in the following descriptions to facilitate understanding of this disclosure. However, embodiments of this disclosure can be implemented in a plurality of other manners different from those described herein, and a person skilled in the art may make similar promotion without departing from the connotation of embodiments of this disclosure. Therefore, this disclosure is not limited to the following disclosed specific implementations.

FIG. 1 is a diagram of a structure of an electronic device according to an embodiment of this disclosure. The electronic device may be a mobile phone, a personal digital assistant (PDA), a notebook computer, a tablet computer, or another device having a foldable function. An example in which the electronic device in the embodiment shown in FIG. 1 is a notebook computer is used for description. The electronic device may include a hinge mechanism 1, a flexible display, and two housings. For ease of description, the two housings are respectively named a first housing 2 and a second housing 3, and the first housing 2 and the second housing 3 are located on two sides of the hinge mechanism 1 and can rotate around the hinge mechanism 1. When the electronic device is used, the electronic device may be closed and unfolded in different use scenarios.

In this disclosure, the electronic device may be an outward folded electronic device. When the outward folded electronic device changes from an unfolded state to a closed state, the flexible display is always located on an outer side of the electronic device. FIG. 1 shows a relative position relationship between the hinge mechanism 1 and the two housings when the electronic device is in the closed state. In this case, a first surface of the hinge mechanism 1, a first surface of the first housing, and a first surface of the second housing may be used together as a support surface of the flexible display. The flexible display is omitted in FIG. 1.

The first surface of the hinge mechanism 1 is a surface that is of the hinge mechanism 1 and that faces the flexible display, the first surface of the first housing 2 is a surface that is of the first housing 2 and that faces the flexible display, and the first surface of the second housing 3 is a surface that is of the second housing 3 and that faces the flexible display.

Figure 2A:
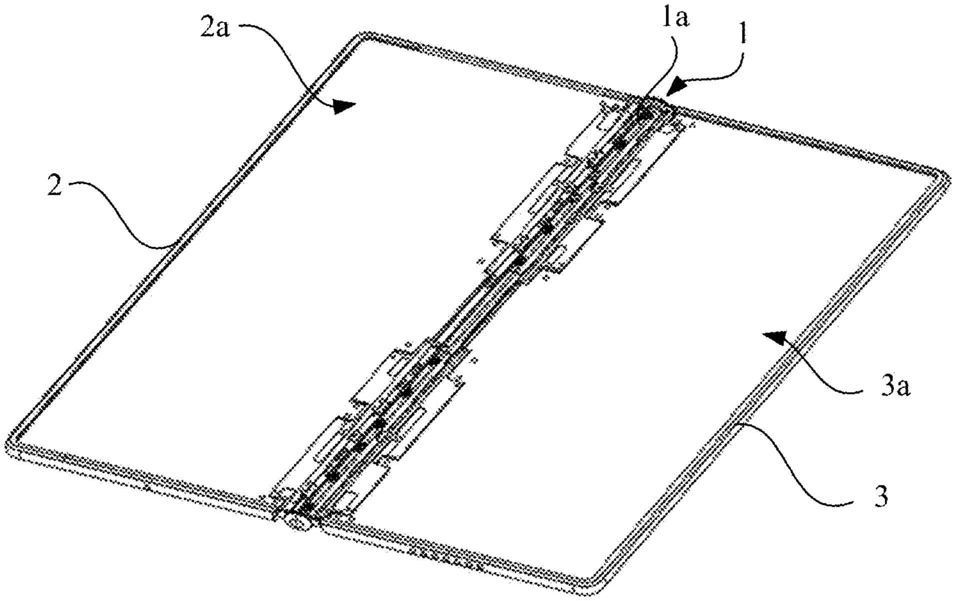
FIG. 2A is a diagram of a structure of an electronic device in an unfolded state according to an embodiment of this disclosure.

FIG. 2A is a diagram of a structure of the electronic device in the unfolded state, and FIG. 2A shows structures of the first surface 2*a* of the first housing 2 and the first surface 3*a* of the second housing 3. In the unfolded state, a support surface 1*a* of the hinge mechanism 1, the first surface 2*a* of the first housing 2, and the first surface 3*a* of the second housing 3 may be connected to form a flat support surface.

Based on this, the flexible display may continuously cover the support surface 1*a* of the hinge mechanism 1, the first surface 2*a* of the first housing 2, and the first surface 3*a* of the second housing 3. The hinge mechanism 1 is disposed opposite to a foldable part of the flexible display, and the flexible display may be fastened to the first surface 2*a* of the first housing 2 and the first surface 3*a* of the second housing 3. A connection manner thereof may be but is not limited to bonding. In this way, when the electronic device is in the unfolded state shown in FIG. 2A, the hinge mechanism 1, the first housing 2, and the second housing 3 may provide flat support for the flexible display.

Figure 2B:
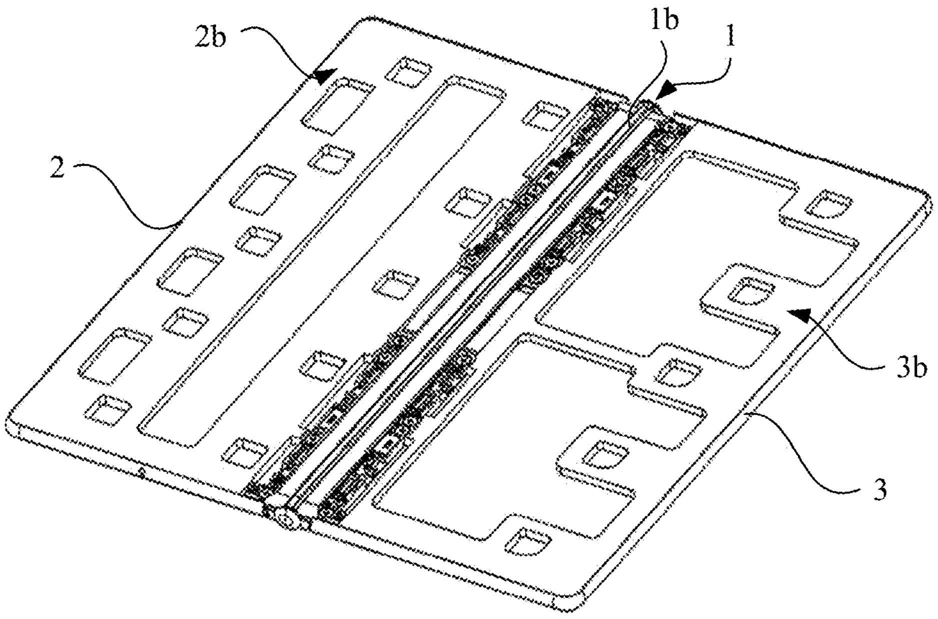
FIG. 2B is another diagram of a structure of an electronic device in an unfolded state according to an embodiment of this disclosure.

FIG. 2B is another diagram of a structure of the electronic device in the unfolded state according to an embodiment of this disclosure. FIG. 2B shows structures of a second surface 1*b* of the hinge mechanism 1, a second surface 2*b* of the first housing 2, and a second surface 3*b* of the second housing 3. The second surface 1*b* of the hinge mechanism 1 is a surface that is of the hinge mechanism 1 and that is away from the flexible display, the second surface 2*b* of the first housing 2 is a surface that is of the first housing 2 and that is away from the flexible display, and the second surface 3*b* of the second housing 3 is a surface that is of the second housing 3 and that is away from the flexible display. In this case, the support surface 1*a* of the hinge mechanism 1 and the second surface 1*b* of the hinge mechanism 1 are disposed opposite to each other, the first surface 2*a* of the first housing 2 and the second surface 2*b* of the first housing 2 are disposed opposite to each other, and the first surface 3*a* of the second housing 3 and the second surface 3*b* of the second housing 3 are disposed opposite to each other.

In this embodiment of this disclosure, the first housing 2 may include a first middle frame and a first cover, and the second housing 3 may include a second middle frame and a second cover. The first cover may cover a surface that is of the first middle frame and that is away from the flexible display, and the second cover may cover a surface that is of the second middle frame and that is away from the flexible display. In this case, accommodation space may be separately formed between the first cover and the first middle frame and between the second cover and the second middle frame, and the two pieces of accommodation space may be used to accommodate components of the electronic device, for example, a battery, a mainboard, a receiver, and a microphone. FIG. 2B shows only the first middle frame of the first housing 2 and the second middle frame of the second housing 3, and the first cover and the second cover are omitted in FIG. 2B. Therefore, the second surface 2*b* of the first housing 2 shown in FIG. 2B is a surface that is of the first middle frame and that is away from the flexible display, but is not an outer surface that is of the first housing 2 and that is away from the flexible display. Similarly, the second surface 3*b* of the second housing 3 shown in FIG. 2B is a surface that is of the second middle frame and that is away from the flexible display, but is not an outer surface that is of the second housing 3 and that is away from the flexible display.

In this embodiment of this disclosure, the second surface 1*b* of the hinge mechanism 1, the outer surface that is of the first housing and that is away from the flexible display, and the outer surface that is of the second housing and that is away from the flexible display may be used together as an appearance surface of the electronic device. It may be understood that, for an outward folded electronic device, when the electronic device is in the unfolded state, an appearance surface of the outward folded electronic device is exposed on an outer side of the electronic device, and when the electronic device is in the closed state, the appearance surface of the outward folded electronic device is located on an inner side of the electronic device. In this disclosure, in a process in which the first housing 2 and the second housing 3 change from the unfolded state shown in FIG. 2A or FIG. 2B to the closed state shown in FIG. 1, or change from the closed state shown in FIG. 1 to the unfolded state shown in FIG. 2A or FIG. 2B, the flexible display may be bent or flattened along with the first housing 2 and the second housing 3. In addition, it may be understood that, a process in which the electronic device changes from the unfolded state shown in FIG. 2A or FIG. 2B to the closed state shown in FIG. 1 or changes from the closed state shown in FIG. 1 to the unfolded state shown in FIG. 2A or FIG. 2B is a process in which the first housing 2 and the second housing 3 rotate around the hinge mechanism 1. The hinge mechanism 1 is used as a key functional component in a foldable electronic device, and may be disposed corresponding to a foldable part of the flexible display. Therefore, in both the unfolded state shown in FIG. 2A or FIG. 2B and the closed state shown in FIG. 1, the hinge mechanism 1 is important in supporting the foldable part of the flexible display.

Figure 3:
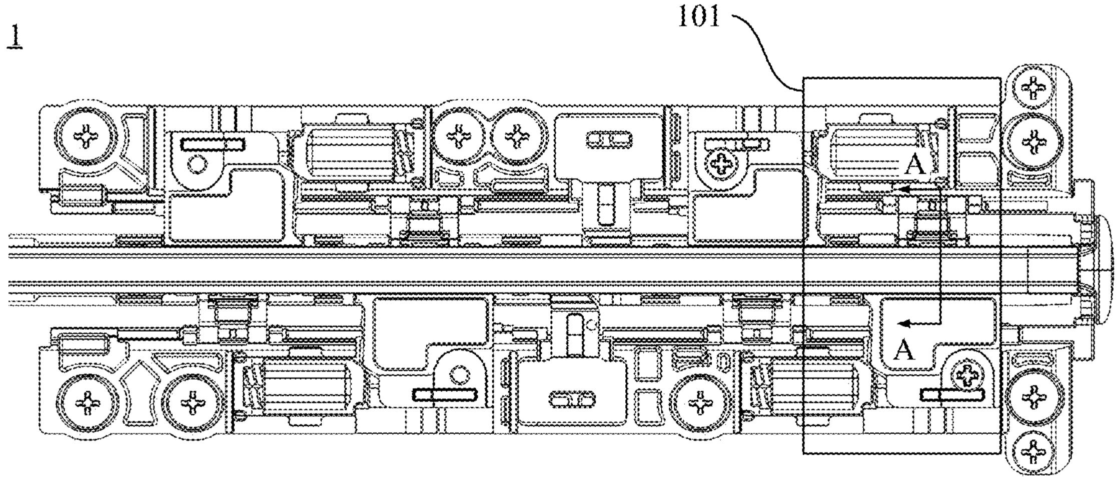
FIG. 3 is a diagram of a partial structure of a hinge mechanism of the electronic device in FIG. 2B.

FIG. 3 is a diagram of a partial structure of the hinge mechanism 1 of the electronic device shown in FIG. 2B. In this disclosure, the hinge mechanism 1 may include a rotating module 101. A quantity of rotating modules 101 in the hinge mechanism 1 is not limited in this disclosure. The hinge mechanism 1 may include only one rotating module 101, or may include a plurality of rotating modules 101. When the hinge mechanism 1 includes the plurality of rotating modules 101, the plurality of rotating modules 101 may be arranged at intervals in an axial direction of the hinge mechanism 1. In this disclosure, the axial direction of the hinge mechanism 1 is an extension direction of an axis along which the first housing 2 and the second housing 3 rotate around the hinge mechanism 1 shown in FIG. 2B. It may be understood that the first housing 2 and the second housing 3 are rotatably connected through the plurality of rotating modules 101. This can effectively improve stability of rotation of the first housing 2 and the second housing 3 of the electronic device relative to the hinge mechanism 1.

Figure 4:
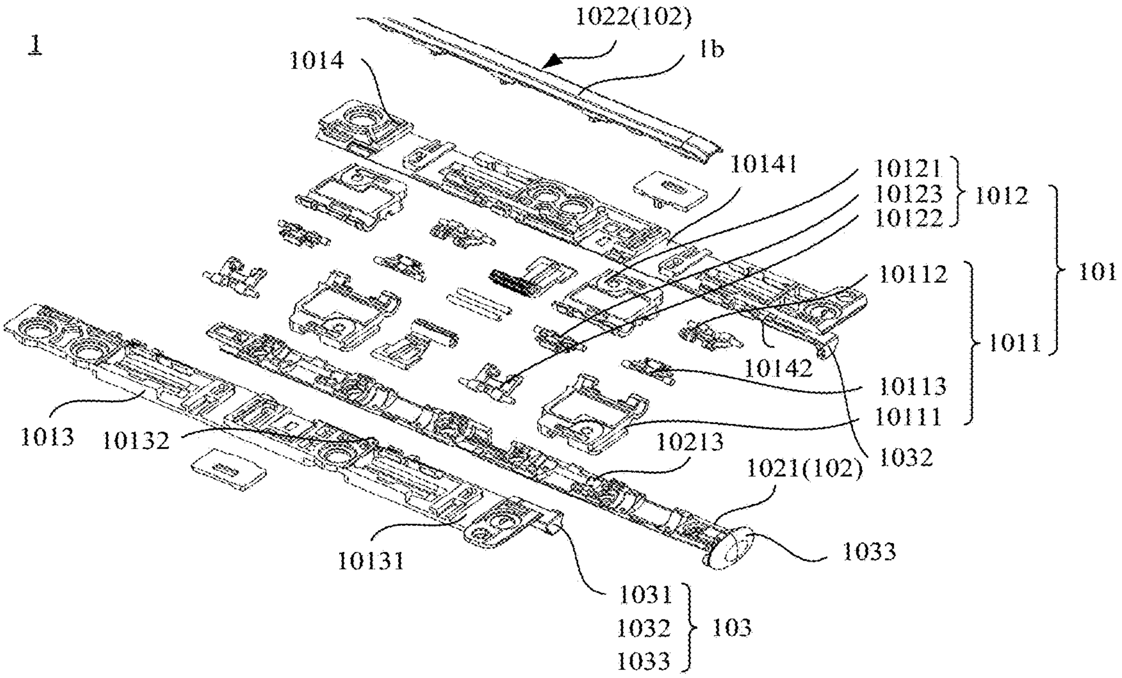
FIG. 4 is an exploded view of the structure shown in FIG. 3.

FIG. 4 is an exploded view of the hinge mechanism 1 shown in FIG. 3. The rotating module 101 may include a first rotating assembly 1011 and a second rotating assembly 1012. In addition, as shown in FIG. 4, the hinge mechanism 1 may further include a main shaft assembly 102, the main shaft assembly 102 may be used as a bearing component for the first rotating assembly 1011 and the second rotating assembly 1012, and the first rotating assembly 1011 and the second rotating assembly 1012 can separately rotate relative to the main shaft assembly.

It should be noted that, in this embodiment of this disclosure, when there is the plurality of rotating modules 101, a same main shaft assembly 102 may be used as a bearing component for both first rotating assemblies 1011 and second rotating assemblies 1012 of the plurality of rotating modules 101, to improve integration of the hinge mechanism 1. In some other possible embodiments of this disclosure, one main shaft assembly 102 may be correspondingly disposed for each rotating module 101 in the hinge mechanism 1, so that a corresponding main shaft assembly 102 is used as a bearing component for a first rotating assembly 1011 and a second rotating assembly 1012 of each rotating module 101.

The hinge mechanism may further include a first housing fastening bracket 1013 and a second housing fastening bracket 1014, and the first housing fastening bracket 1013 and the second housing fastening bracket 1014 are respectively disposed on two opposite sides of the main shaft assembly 102. The first housing fastening bracket 1013 may be configured to be fastened to the first housing 2, for example, may be fastened to the first middle frame of the first housing 2. The second housing fastening bracket 1014 may be configured to be fastened to the second housing 3, for example, may be fastened to the second middle frame of the second housing 3. In addition, the first housing fastening bracket 1013 may be further in a transmission connection with the first rotating assembly 1011, so that the first housing fastening bracket 1013 and the first housing 2 can also rotate relative to the main shaft assembly 102, and the second housing 3 may be further in a transmission connection with the second rotating assembly 1012, so that the second housing fastening bracket 1014 and the second housing 3 can also rotate relative to the main shaft assembly 102. When the electronic device is unfolded or folded, the first housing fastening bracket 1013 rotates synchronously with the first housing 2, the second housing fastening bracket 1014 rotates synchronously with the second housing 3. Then, the first housing fastening bracket 1013 drives the first rotating assembly 1011 to rotate around the main shaft assembly, and the second housing fastening bracket 1014 drives the second rotating assembly 1012 to rotate around the main shaft assembly. In this way, movement tracks of the first housing 2 and the second housing 3 can be limited by properly designing structures of the first rotating assembly 1011 and the second rotating assembly 1012, so that the electronic device is unfolded and folded by using the first housing 2 and the second housing 3 in a specified rotation manner.

In addition, to reduce a risk that a mechanical part (including a rotating assembly, a housing fastening bracket, a housing, or the like) of the electronic device is misplaced or damaged in a scenario in which the electronic device falls, collides, or the like, the electronic device in this embodiment of this disclosure further provides a support assembly 103 that can provide limiting and supporting functions for the foregoing mechanical part, so that the electronic device can be effectively supported in both the unfolded state and the folded state, and structural reliability of the electronic device can be improved.

To present the support assembly 103 in this embodiment of this disclosure more clearly and completely, before a specific structure of the support assembly 103 is described, first refer to a specific implementation of the hinge mechanism shown in FIG. 4 to FIG. 16. The hinge mechanism 1 can not only implement the limiting and supporting functions for the mechanical part such as the rotating assembly, the housing fastening bracket, or the housing, but also provide flat support for the flexible display. In an intermediate state of the electronic device and in a process in which the electronic device is unfolded or folded, a bending part of the flexible display is subject to uniform force by using the hinge mechanism 1. In addition, when the electronic device is in a folded state, the hinge mechanism 1 provides accommodation space for the flexible display, and the accommodation space can ensure that the bending part of the flexible display has a curvature to some extent, to avoid being squeezed. Further, the hinge mechanism 1 can further enable a length of the flexible display to remain unchanged in an entire unfolding or folding process of the electronic device, to ensure reliability of the flexible display.

It should be understood that a rotating assembly may be connected to a housing fastening bracket in various manners. For example, the rotating assembly may be rotatably connected to a main shaft assembly, and the rotating assembly may be fixedly/rotatably/slidably connected to the housing fastening bracket. The following embodiments are merely a possible implementation of a rotating assembly for implementing folding and unfolding functions of the electronic device. The rotating assembly may alternatively be implemented in another manner. Provided that the rotating assembly can enable a housing support to rotate relative to the main shaft assembly to implement folding and unfolding functions of the hinge mechanism, the rotating assembly falls within the scope covered by embodiments of this disclosure. Correspondingly, the support assembly 103 in this embodiment of this disclosure is applicable to any electronic device having a foldable function.

The following describes an example design of the hinge mechanism.

Still refer to FIG. 4. In this embodiment of this disclosure, the first rotating assembly 1011 may include a first swing arm 10111, a first support arm 10112, and a first connector 10113. The first connector 10113 is located between the first swing arm 10111 and the first support arm 10112, the first connector 10113 is rotatably connected to the first swing arm 10111, and the first connector 10113 is rotatably connected to the first support arm 10112. In this way, the first swing arm 10111 and the first support arm 10112 may move and pull each other through the first connector 10113. Based on this, it may be understood that a movement track of the first connector 10113 plays a key role in a movement track of the first rotating assembly 1011.

Figure 5:
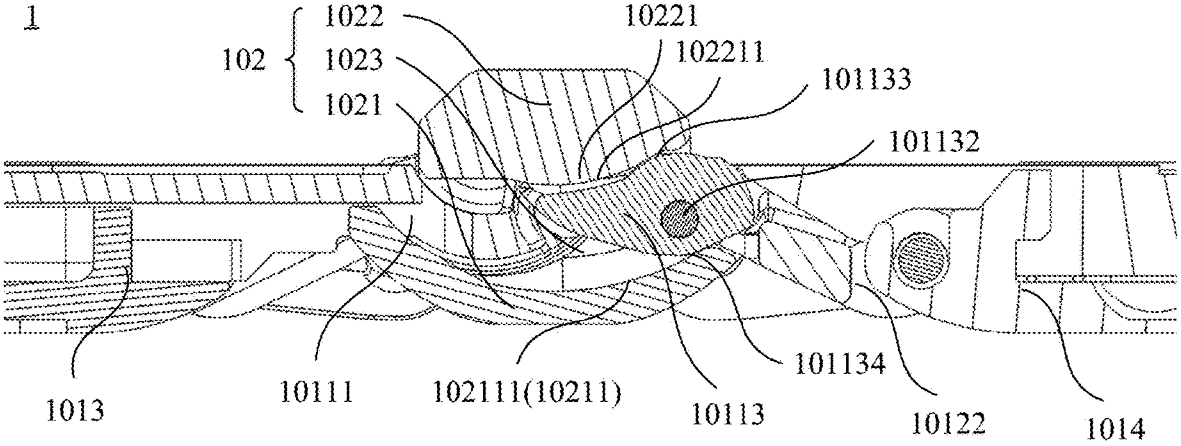
FIG. 5 is a sectional view at a first connector of a hinge mechanism when an electronic device is in an unfolded state according to an embodiment of this disclosure.

In this disclosure, the first connector 10113 may move relative to the main shaft assembly 102. During specific implementation, FIG. 5 is a sectional view at the first connector 10113 of the hinge mechanism 1 when the electronic device is in the unfolded state according to an embodiment of this disclosure. The main shaft assembly 102 may be provided with a first track slot 1023, and the first connector 10113 may move along the first track slot 1023, to limit the movement track of the first connector 10113.

Figure 6:
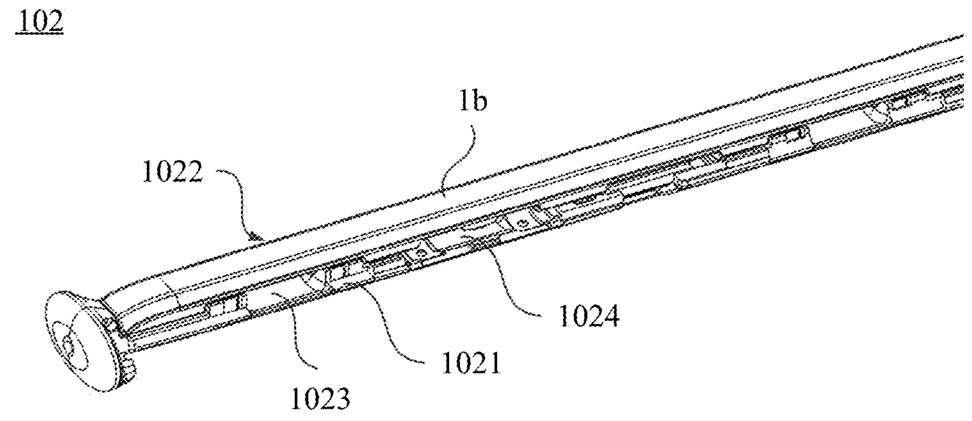
FIG. 6 is a diagram of a structure of a main shaft assembly according to an embodiment of this disclosure.
Figure 7:
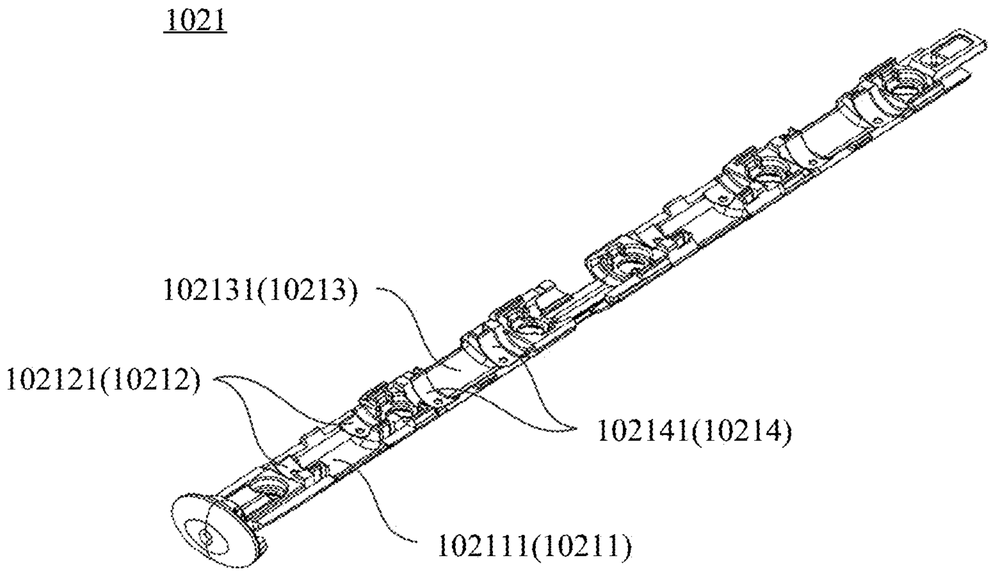
FIG. 7 is a diagram of a structure of a base of the main shaft assembly shown in FIG. 6.
Figure 8:
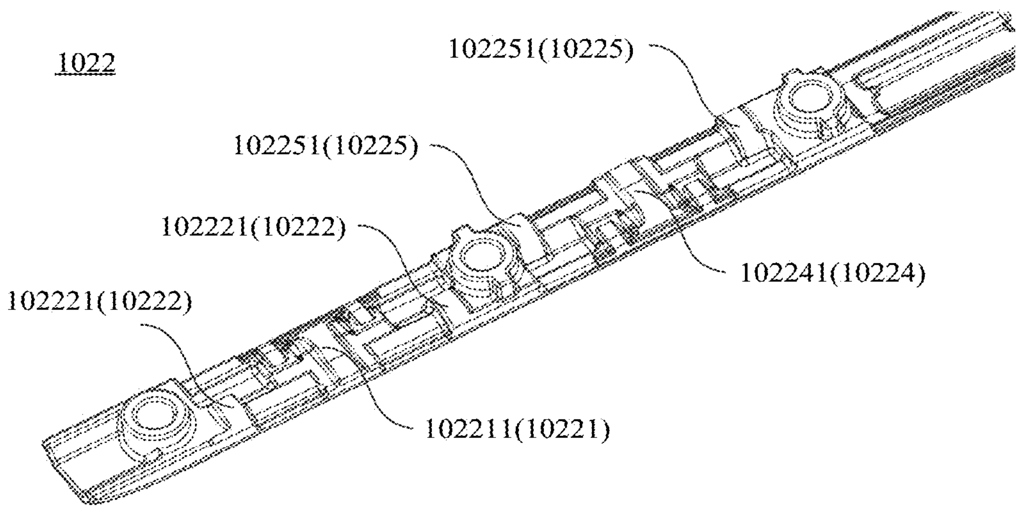
FIG. 8 is a diagram of a structure of a cover plate of the main shaft assembly shown in FIG. 6.

FIG. 6 is a diagram of a structure of the main shaft assembly 102 according to an embodiment of this disclosure. The main shaft assembly 102 may include a base 1021 and a cover plate 1022, the cover plate 1022 covers the base 1021, and an outer surface of the cover plate 1022 may be used as an appearance surface of the hinge mechanism. FIG. 7 is a diagram of a structure of the base 1021 of the main shaft assembly 102 shown in FIG. 6. The base 1021 may be provided with a first arc-shaped groove 10211. Refer to both FIG. 5 and FIG. 7, the first connector 10113 is accommodated in the first arc-shaped groove 10211, and the first connector 10113 may slide along a groove surface 102111 of the first arc-shaped groove. In addition, FIG. 8 is a diagram of a structure of the cover plate 1022 of the main shaft assembly 102 shown in FIG. 6, and FIG. 8 shows a structure of a side that is of the cover plate 1022 and that faces the base 1021. The cover plate 1022 includes a first protruding part 10221. As shown in FIG. 5, the first protruding part 10221 may be disposed facing the first arc-shaped groove 10211, a gap exists between a surface 102211 of the first protruding part and the groove surface 102111 of the first arc-shaped groove, and the gap is used as the first track slot 1023.

Figure 9:
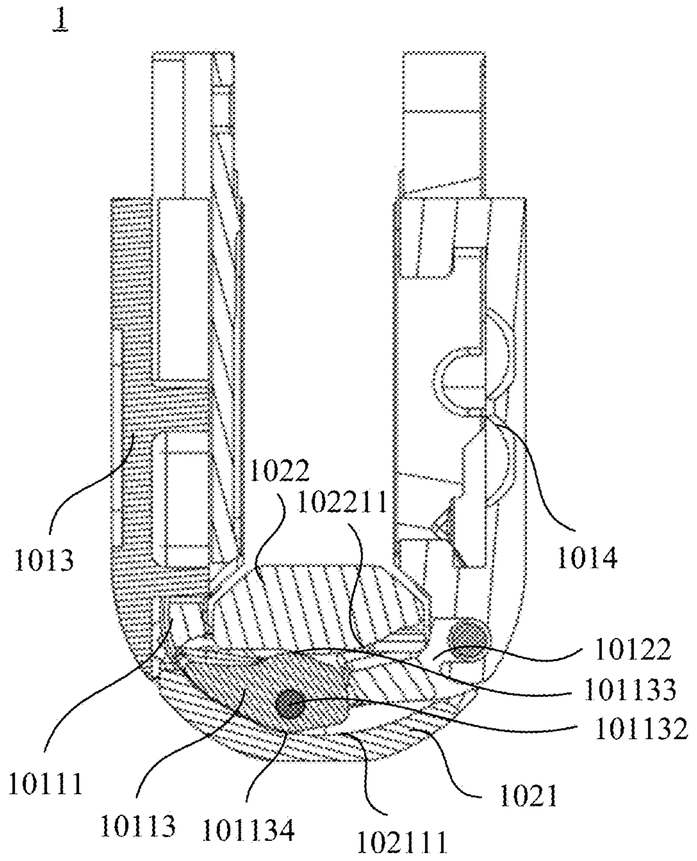
FIG. 9 is a sectional view at a first connector of a hinge mechanism when an electronic device is in a closed state according to an embodiment of this disclosure.

FIG. 9 is a sectional view at the first connector 10113 of the hinge mechanism 1 when the electronic device is in the closed state according to an embodiment of this disclosure. Refer to both FIG. 5 and FIG. 9. In a process in which the electronic device changes from the unfolded state to the closed state, the first connector 10113 may move toward the first swing arm 10111 in the first track slot 1023, and in a process in which the electronic device changes from the closed state to the unfolded state, the first connector 10113 may move toward the first support arm 10112 in the first track slot 1023. In this way, the first connector 10113 can move relative to the main shaft assembly 102 according to a specified track.

Refer to both FIG. 5 and FIG. 9. It can be learned that in the process in which the electronic device changes from the unfolded state to the closed state or in the process in which the electronic device changes from the closed state to the unfolded state, the first swing arm 10111 and the first support arm 10112 may rotate around the main shaft assembly 102. In addition, because the first swing arm 10111 and the first support arm 10112 move and pull each other through the first connector 10113, in a process in which the first connector 10113 moves in the first track slot 1023, the first connector 10113 may further rotate relative to the surface 102211 of the first protruding part and the groove surface 102111 of the first arc-shaped groove, to improve smoothness of movement of the first rotating assembly 1011.

Figure 10:
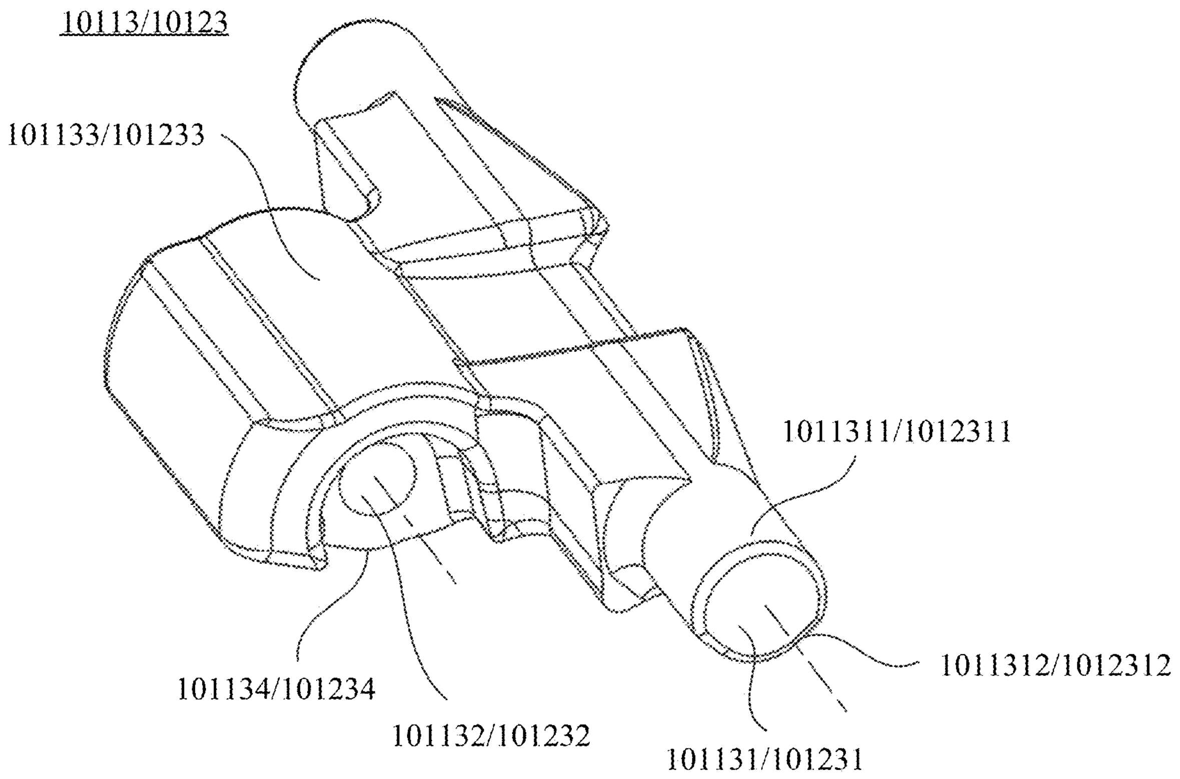
FIG. 10 is a diagram of a structure of a first connector according to an embodiment of this disclosure.

FIG. 10 is a diagram of a structure of the first connector 10113 according to an embodiment of this disclosure. In this disclosure, the first connector 10113 may include a first arc-shaped surface 101133 and a second arc-shaped surface 101134. To implement rotation of the first connector 10113 relative to the surface 102211 of the first protruding part and the groove surface 102111 of the first arc-shaped groove, the first arc-shaped surface 101133 and the second arc-shaped surface 101134 may be circular arc-shaped surfaces, and a circle center of the first arc-shaped surface 101133 coincides with a circle center of the second arc-shaped surface 101134. A radius of the first arc-shaped surface 101133 may be equal to or different from a radius the second arc-shaped surface 101134. This is not limited in this disclosure. In addition, due to a design tolerance, the first arc-shaped surface 101133 and the second arc-shaped surface 101134 may alternatively be arc-shaped surfaces in other possible forms such as elliptical arc-shaped surfaces, provided that the first connector 10113 can rotate relative to the surface 102211 of the first protruding part and the groove surface 102111 of the first arc-shaped groove.

Still refer to FIG. 5 and FIG. 9. When the electronic device is in the unfolded state shown in FIG. 5 and the closed state shown in FIG. 9, the first arc-shaped surface 101133 of the first connector 10113 may abut the surface 102211 of the first protruding part, and the second arc-shaped surface 101134 abuts the groove surface 102111 of the first arc-shaped groove. In this way, the surface 102211 of the first protruding part and the groove surface 102111 of the first arc-shaped groove limit the first connector 10113 in the first track slot 1023, so that when the hinge mechanism 1 is in the unfolded state and the closed state, a position of the first connector 10113 is stable, and the first connector 10113 does not shake due to a gap. In this way, reliability of the hinge mechanism 1 in the foregoing two states can be improved.

In this disclosure, when the electronic device is in the unfolded state shown in FIG. 5, a spacing between a point at which the surface 102211 of the first protruding part abuts the first arc-shaped surface 101133 and a point at which the groove surface 102111 of the first arc-shaped groove abuts the second arc-shaped surface 101134 is denoted as d1. When the electronic device is in the closed state shown in FIG. 9, a spacing between a point at which the surface 102211 of the first protruding part abuts the first arc-shaped surface 101133 and a point at which the groove surface 102111 of the first arc-shaped groove abuts the second arc-shaped surface 101134 is denoted as d2. When the electronic device is in the unfolded state and the closed state, the first arc-shaped surface 101133 of the first connector 10113 may abut the surface 102211 of the first protruding part, and the second arc-shaped surface 101134 abuts the groove surface 102111 of the first arc-shaped groove. In this case, when both the first arc-shaped surface 101133 and the second arc-shaped surface 101134 are circular arc-shaped surfaces, it may be obtained that d1=d2.

Specific disposing forms of the surface 102211 of the first protruding part and the groove surface 102111 of the first arc-shaped groove are not limited in this disclosure. For example, the surface 102211 of the first protruding part may be a circular arc-shaped surface, and the groove surface 102111 of the first arc-shaped groove is a circular arc-shaped surface. In addition, a circle center of the surface 102211 of the first protruding part coincides with a circle center of the groove surface 102111 of the first arc-shaped groove. In some other possible embodiments of this disclosure, both the surface 102211 of the first protruding part and the groove surface 102111 of the first arc-shaped groove may be disposed as planes, so that the first track slot 1023 is a straight slot. Alternatively, the surface 102211 of the first protruding part and the groove surface 102111 of the first arc-shaped groove may be curved surfaces in other forms, and the first track slot 1023 is a curved slot in any form. It should be understood that the two first track slots 1023 fall within the protection scope of this disclosure.

Still refer to FIG. 5. In this disclosure, spacings between the surface 102211 of the first protruding part and the groove surface 102111 of the first arc-shaped groove may be equal. In this case, the first track slot 1023 is an equal-width slot. In this case, in the process in which the electronic device changes from the unfolded state to the closed state and in the process in which the electronic device changes from the closed state to the unfolded state, the surface 102211 of the first protruding part always abuts the first arc-shaped surface 101133, and the groove surface 102111 of the first arc-shaped groove always abuts the second arc-shaped surface 101134. In this way, in the process in which the electronic device changes from the unfolded state to the closed state and in the process in which the electronic device changes from the closed state to the unfolded state, movement tracks of the first connector 10113 are the same. This can help improve stability of movement of the first connector 10113, and improve stability of movement of the first rotating assembly 1011.

Figure 11:
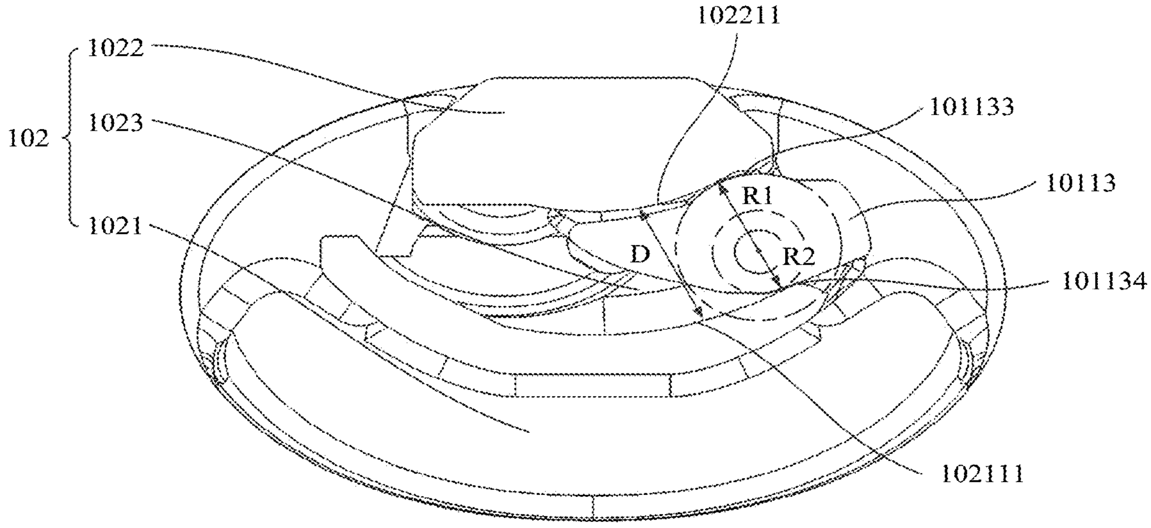
FIG. 11 is a diagram of an assembly structure of a first connector and a main shaft assembly according to an embodiment of this disclosure.

FIG. 11 is a diagram of an assembly structure of the first connector 10113 and the main shaft assembly 102 according to an embodiment of this disclosure. In this disclosure, when the first track slot 1023 is an equal-width slot, and the first arc-shaped surface 101133 and the second arc-shaped surface 101134 are circular arc-shaped surfaces, a sum of the radius R1 of the first arc-shaped surface 101133 and the radius R2 of the second arc-shaped surface 101134 is equal to a spacing D between the surface 102211 of the first protruding part and the groove surface 102111 of the first arc-shaped groove. In addition, smoothness of movement of the first connector 10113 in the first track slot 1023 is considered, and a specific design gap is reserved between the first arc-shaped surface 101133 and the surface 102211 of the first protruding part, and/or a specific design gap is reserved between the second arc-shaped surface 101134 and the groove surface 102111 of the first arc-shaped groove.

In some other possible embodiments of this disclosure, a movement track of the first connector 10113 in the process in which the electronic device changes from the unfolded state to the closed state may be alternatively different from a movement track of the first connector 10113 in the process in which the electronic device changes from the closed state to the unfolded state. During specific implementation, in the process in which the electronic device changes from the unfolded state to the closed state, the first arc-shaped surface 101133 abuts the surface 102211 of the first protruding part, and a gap exists between the second arc-shaped surface 101134 and the groove surface 102111 of the first arc-shaped groove. In addition, in the process in which the electronic device changes from the unfolded state to the closed state, the second arc-shaped surface 101134 abuts the groove surface 102111 of the first arc-shaped groove, and a gap exists between the first arc-shaped surface 101133 and the surface 102211 of the first protruding part. In this embodiment, gaps between the surface 102211 of the first protruding part and the groove surface 102111 of the first arc-shaped groove may be unequal. In this case, the first track slot 1023 may be an unequal-width slot.

It can be learned from the foregoing descriptions that, in this disclosure, the first swing arm 10111 may be rotatably connected to the main shaft assembly 102, and the first swing arm 10111 may be rotatably connected to the main shaft assembly 102 in a virtual axis manner. This can help reduce space occupied by the first swing arm 10111 on the main shaft assembly 102, help reduce a volume of the rotating module 101, and implement a miniaturization design of the hinge mechanism 1. In addition, it may be understood that, for an outward folded electronic device, when the first swing arm 10111 is rotatably connected to the main shaft assembly 102 in the virtual axis manner, an axis center of rotation of the first swing arm 10111 around the main shaft assembly 102 is located on a side that is of the main shaft assembly 102 and that is away from the flexible display.

Figure 12:
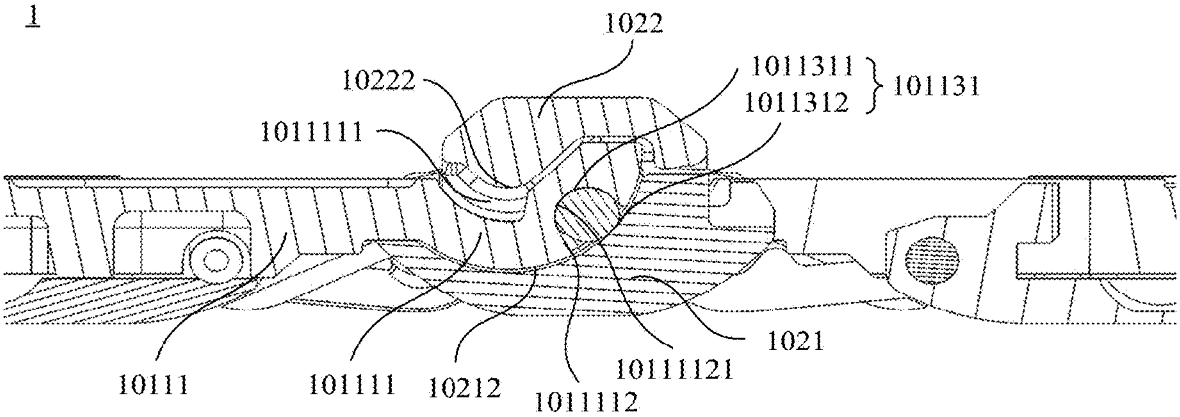
FIG. 12 is an A-A sectional view of the structure shown in FIG. 3.

It should be noted that, in this disclosure, a virtual axis is an axis center of a circular arc-shaped structure, two rotatably connected components can rotate relative to the virtual axis, and a position of the virtual axis is fixed as the two rotatably connected components rotate relative to the virtual axis. For example, FIG. 12 is an A-A sectional view of the structure shown in FIG. 3. A first arc-shaped rotating block 101111 may be disposed at an end that is of the first swing arm 10111 and that faces the base 1021. In addition, refer to FIG. 7. The base 1021 may be provided with a second arc-shaped groove 10212. In this case, the first arc-shaped rotating block 101111 may be accommodated in the second arc-shaped groove 10212, and the first arc-shaped rotating block 101111 may slide along a groove surface of the second arc-shaped groove 10212, so that the first swing arm 10111 can rotate around the main shaft assembly 102 by sliding of the first arc-shaped rotating block 101111 along an arc-shaped surface of the second arc-shaped groove 10212. In addition, in this disclosure, the first arc-shaped rotating block 101111 may be but is not limited to a circular arc-shaped rotating block, and the second arc-shaped groove 10212 may be but is not limited to a circular arc-shaped groove. It may be understood that, when the first arc-shaped rotating block 101111 is the circular arc-shaped rotating block, a surface that is of the first arc-shaped rotating block 101111 and that is in contact with the groove surface of the second arc-shaped groove 10212 may be a circular arc-shaped surface. In addition, the groove surface of the second arc-shaped groove 10212 is also a circular arc-shaped surface, and circle centers of the two-circular arc-shaped surfaces coincide.

Refer to both FIG. 8 and FIG. 12. The cover plate 1022 may include a second protruding part 10222 disposed facing the second arc-shaped groove 10212, at least a part of the first arc-shaped rotating block 101111 is located between the second protruding part 10222 and the second arc-shaped groove 10212, and the first arc-shaped rotating block 101111 may be in contact with a surface 102221 of the second protruding part. This can limit the first arc-shaped rotating block 101111 between the cover plate 1022 and the base 1021, and effectively improve stability of rotation of the first arc-shaped rotating block 101111 relative to the base 1021.

It should be noted that, when the groove surface of the second arc-shaped groove 10212 is a circular arc-shaped surface, a part that is of the surface 102221 of the second protruding part and that is in contact with the first arc-shaped rotating block 101111 may also be a circular arc-shaped surface, and circle centers of the two-circular arc-shaped surfaces coincide. In addition, a surface that is of the first arc-shaped rotating block 101111 and that faces the second protruding part 10222 may be a plane or a circular arc-shaped surface, provided that the first arc-shaped rotating block 101111 can rotate relative to the second protruding part 10222.

Figure 13:
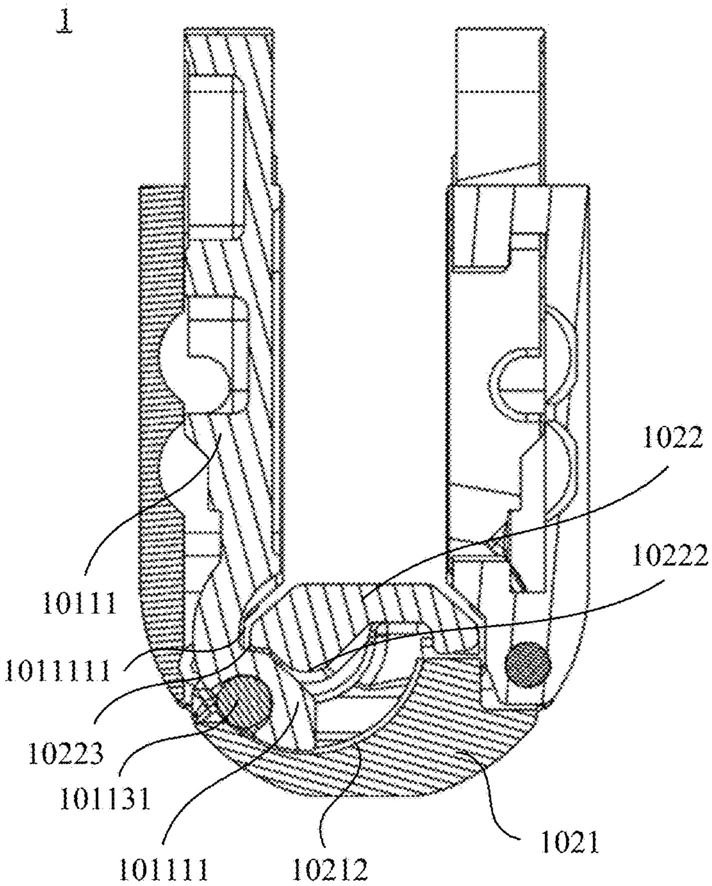
FIG. 13 is a sectional view at a first swing arm of a hinge mechanism when an electronic device is in a closed state according to an embodiment of this disclosure.

FIG. 13 is a sectional view at the first swing arm 10111 of the hinge mechanism 1 when the electronic device is in the closed state according to an embodiment of this disclosure. In this disclosure, the first arc-shaped rotating block 101111 may be further provided with a first concave part 1011111, and an opening of the first concave part 1011111 is disposed facing the cover plate 1022. In addition, a first plug part 10223 may be disposed at an end part that is of the cover plate 1022 and that faces the first swing arm 10111. In the closed state, the first plug part 10223 may be plugged into the first concave part 1011111, and a surface that is of the first plug part 10223 and that faces the second arc-shaped groove 10212 abuts at least a part of a surface of the first concave part 1011111. This can limit a rotation position of the first arc-shaped rotating block 101111, prevent the first arc-shaped rotating block 101111 from falling out of the second arc-shaped groove 10212, improve reliability of a connection between the first swing arm 10111 and the base 1021, and improve structural reliability of the entire hinge mechanism 1.

It should be noted that, in this disclosure, in addition to being rotatably connected to the main shaft assembly 102 in the virtual axis manner, the first swing arm 10111 may alternatively be rotatably connected to the main shaft assembly 102 in a solid axis manner that enables a connection between the first swing arm 10111 and the main shaft assembly 102 to be reliable. It may be understood that, when the first swing arm 10111 is rotatably connected to the main shaft assembly 102 in the solid axis manner, an axis center of rotation of the first swing arm 10111 around the main shaft assembly 102 is also located on the side that is of the main shaft assembly 102 and that is away from the flexible display.

In this disclosure, when the first swing arm 10111 is rotatably connected to the first connector 10113, still refer to FIG. 10. The first connector 10113 may include a first rotating shaft 101131 and a second rotating shaft 101132, and an axis of the first rotating shaft 101131 is parallel to and does not coincide with an axis of the second rotating shaft 101132.

Figure 14:
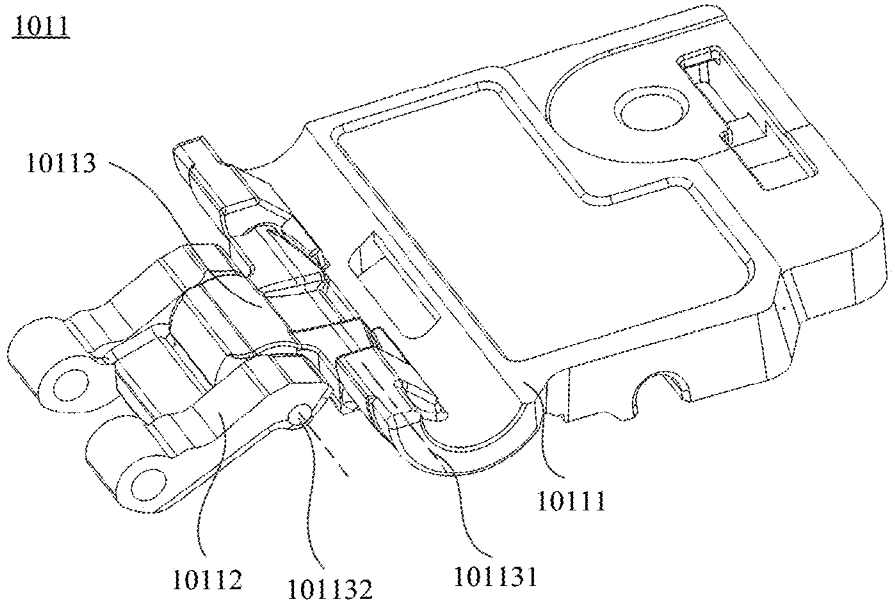
FIG. 14 is a diagram of a structure of a first rotating assembly according to an embodiment of this disclosure.

In addition, FIG. 14 is a diagram of a structure of the first rotating assembly 1011 according to an embodiment of this disclosure. The first connector 10113 is rotatably connected to the first swing arm 10111 through the first rotating shaft 101131, and the first connector 10113 is rotatably connected to the first support arm 10112 through the second rotating shaft 101132. In this way, the first swing arm 10111 and the first support arm 10112 may move and pull each other through the first connector 10113.

Figure 15:
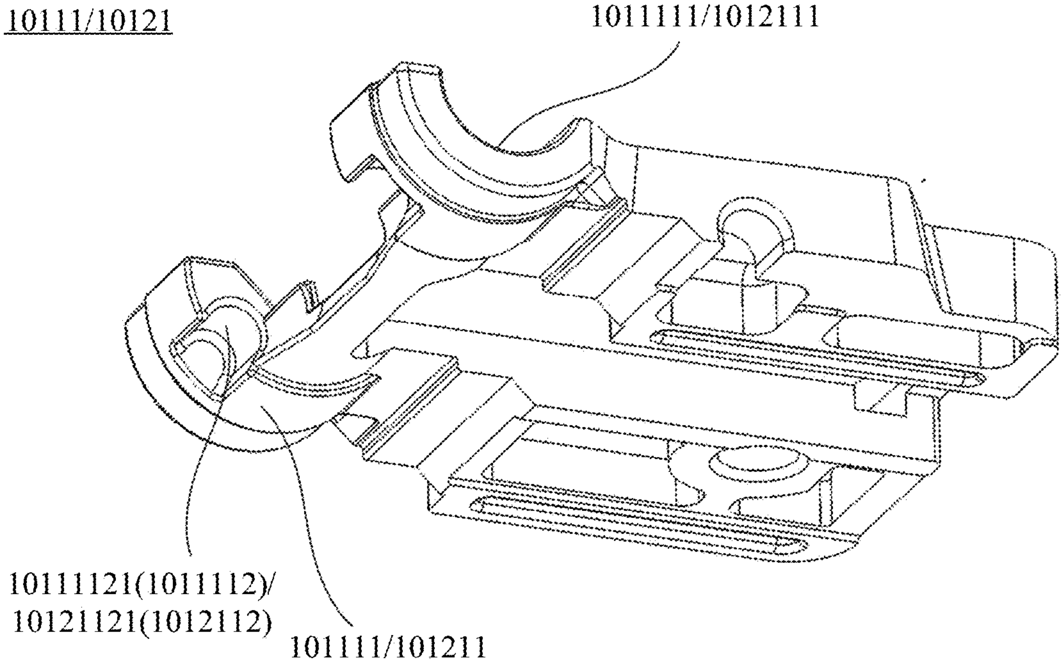
FIG. 15 is a diagram of a structure of a first swing arm according to an embodiment of this disclosure.

FIG. 15 is a diagram of a structure of the first swing arm 10111 according to an embodiment of this disclosure. The first arc-shaped rotating block 101111 of the first swing arm 10111 is provided with a first mounting groove 1011112. Refer to both FIG. 12 and FIG. 15. A groove opening of the first mounting groove 1011112 is disposed facing the second arc-shaped groove 10212. In this case, the first rotating shaft 101131 may be mounted in the first mounting groove 1011112, a part of a surface of the first rotating shaft 101131 may be in contact with a groove surface of the first mounting groove 1011112, and a part of a surface of the first rotating shaft 101131 is in contact with the groove surface of the second arc-shaped groove 10212, to limit the first rotating shaft 101131 in the first mounting groove 1011112.

Still refer to FIG. 12 and FIG. 15. The groove surface of the first mounting groove 1011112 may include a first circular arc-shaped surface 10111121, a surface that is of the first rotating shaft 101131 and that is in contact with the groove surface of the first mounting groove 1011112 is a second circular arc-shaped surface 1011311, and a circle center of the first circular arc-shaped surface 10111121 coincides with a circle center of the second circular arc-shaped surface 1011311. In addition, refer to FIG. 7. The groove surface of the second arc-shaped groove 10212 may be a third circular arc-shaped surface 102121. As shown in FIG. 12, a surface that is of the first rotating shaft 101131 and that is in contact with the groove surface of the second arc-shaped groove 10212 may be a fourth circular arc-shaped surface 1011312, and a circle center of the third circular arc-shaped surface 102121 coincides with a circle center of the fourth circular arc-shaped surface 1011312. In this way, refer to both FIG. 12 and FIG. 13. When the first rotating shaft 101131 slides along the groove surface of the second arc-shaped groove 10212 with the first arc-shaped rotating block 101111, the first rotating shaft 101131 may further rotate relative to the first arc-shaped rotating block 101111, so that the first connector 10113 can move relative to the main shaft assembly 102.

In this disclosure, when the first connector 10113 is rotatably connected to the first support arm 10112, as shown in FIG. 14, the second rotating shaft 101132 may pass through both the first connector 10113 and the first support arm 10112. In this way, a connection manner between the first connector 10113 and the first support arm 10112 is simple, the structure of the first rotating assembly 1011 is simplified, and the structure of the hinge mechanism 1 is further simplified. It should be noted that, when both the first arc-shaped surface 101133 and the second arc-shaped surface 101134 of the first connector 10113 are circular arc-shaped surfaces, the circle center of the first arc-shaped surface 101133, the circle center of the second arc-shaped surface 101134, and an axis center of the second rotating shaft 101132 coincide.

It may be understood that, in the hinge mechanism 1 provided in this embodiment of this disclosure, the first connector 10113 may include a plurality of first sub-connectors that are sequentially rotatably connected. In addition, the plurality of first sub-connectors may be located between the first swing arm 10111 and the first support arm 10112. In this case, the first swing arm 10111 may be rotatably connected to an adjacent first sub-connector, and the first support arm 10112 may be rotatably connected to an adjacent first sub-connector. For a specific manner of a rotating connection between the first swing arm 10111 and the adjacent first sub-connector and a specific manner of a rotating connection between the first support arm 10112 and the adjacent first sub-connector, refer to the foregoing descriptions of a rotating connection between the first swing arm 10111 and the first connector 10113 and a rotating connection between the first support arm 10112 and the first connector 10113. Details are not described herein again. In this disclosure, the first connector 10113 is disposed as the plurality of first sub-connectors that is sequentially rotatably connected, so that the first swing arm 10111 is connected to the first support arm 10112 through the plurality of first sub-connectors. This can effectively improve uniformity between a speed at which the first swing arm 10111 rotates around the main shaft assembly 102 and a speed at which the first support arm 10112 rotates around the main shaft assembly 102, and improve smoothness of movement and mutual pulling between the first swing arm 10111 and the first support arm 10112.

Still refer to FIG. 4. Similar to the structure of the first rotating assembly 1011, when the second rotating assembly 1012 is disposed, the second rotating assembly 1012 is located between the first housing fastening bracket 1013 and the second housing fastening bracket 1014. In addition, the second rotating assembly 1012 may include a second swing arm 10121, a second support arm 10122, and a second connector 10123. The second connector 10123 is located between the second swing arm 10121 and the second support arm 10122, the second connector 10123 is rotatably connected to the second swing arm 10121, and the second connector 10123 is rotatably connected to the second support arm 10122. In this disclosure, when the second connector 10123 is rotatably connected to the second swing arm 10121 and the first support arm 10112, for a disposing manner between the second connector 10123 and the second swing arm 10121 and a disposing manner between the second connector 10123 and the second support arm 10122, refer to a rotating connection manner between the first connector 10113 and the second swing arm 10121 and a rotating connection manner between the first connector 10113 and the second support arm 10122. For example, FIG. 10 may also indicate a structure of the second connector 10123 according to this embodiment of this disclosure. The second connector 10123 may include a third rotating shaft 101231 and a fourth rotating shaft 101232. An axis of the third rotating shaft 101231 is parallel to and does not coincide with an axis of the fourth rotating shaft 101232. The second connector 10123 may be rotatably connected to the second swing arm 10121 through the third rotating shaft 101231, and the second connector 10123 is rotatably connected to the second support arm 10122 through the fourth rotating shaft 101232. In this way, the second swing arm

10121 and the second support arm 10122 move and pull each other through the second connector 10123.

In addition, refer to FIG. 6. The main shaft assembly 102 may be provided with a second track slot 1024, and the second connector 10123 may move along the second track slot, to limit a movement track of the second connector 10123. During specific implementation, refer to FIG. 7. The base 1021 may be provided with a third arc-shaped groove 10213, the second connector 10123 is accommodated in the third arc-shaped groove 10213, and the second connector 10123 may slide along a groove surface of the third arc-shaped groove 10213. In addition, refer to FIG. 8. The cover plate 1022 includes a third protruding part 10224, the third protruding part 10224 may be disposed facing the third arc-shaped groove 10213 of the base 1021 in FIG. 7, a gap exists between a surface 102241 of the third protruding part and the groove surface 102131 of the third arc-shaped groove, and the gap is used as the second track slot 1024.

In this disclosure, as shown in FIG. 10, the second connector 10123 may include a third arc-shaped surface 101233 and a fourth arc-shaped surface 101234. When the electronic device is in the unfolded state and the closed state, the third arc-shaped surface 101233 of the second connector 10123 may abut the surface 102241 of the third protruding part, and the fourth arc-shaped surface 101234 abuts the groove surface 102131 of the third arc-shaped groove. In this way, the surface 102241 of the third protruding part and the groove surface 102131 of the third arc-shaped groove limit the second connector 10123 in the second track slot 1024, so that when the hinge mechanism 1 is in the unfolded state and the closed state, a position of the second connector 10123 is stable, and the second connector 10123 does not shake due to a gap. In this way, structural reliability of the hinge mechanism 1 in the foregoing two states can be improved.

In this embodiment of this disclosure, the third arc-shaped surface 101233 of the second connector 10123 may be disposed with reference to the first arc-shaped surface 101133 of the first connector 10113, and the fourth arc-shaped surface 101234 may be disposed with reference to the second arc-shaped surface 101134 of the first connector 10113. Details are not described herein again. In addition, the second track slot 1024 may be disposed with reference to the first track slot 1023. Simply put, spacings between the surface 102241 of the third protruding part and the groove surface 102131 of the third arc-shaped groove are equal, and the second track slot 1024 is an equal-width slot. In this case, in the process in which the electronic device changes from the unfolded state to the closed state and in the process in which the electronic device changes from the closed state to the unfolded state, the surface 102241 of the third protruding part always abuts the third arc-shaped surface 101233, and the groove surface 102131 of the third arc-shaped groove always abuts the fourth arc-shaped surface 101234. Therefore, in the process in which the electronic device changes from the unfolded state to the closed state and in the process in which the electronic device changes from the closed state to the unfolded state, movement tracks of the second connector 10123 in the second track slot 1024 are the same. Alternatively, in the process in which the electronic device changes from the unfolded state to the closed state, the third arc-shaped surface 101233 abuts the surface 102241 of the third protruding part, and a gap exists between the fourth arc-shaped surface 101234 and the groove surface 102131 of the third arc-shaped groove, and in the process in which the electronic device changes from the closed state to the unfolded state, the fourth arc-shaped surface 101234 abuts the groove surface 102131 of the third arc-shaped groove, and a gap exists between the third arc-shaped surface 101233 and the surface 102241 of the third protruding part. In this way, a movement track of the second connector 10123 in the process in which the electronic device changes from the unfolded state to the closed state is different from a movement track of the second connector 10123 in the process in which the electronic device changes from the closed state to the unfolded state.

In this disclosure, the second swing arm 10121 is rotatably connected to the main shaft assembly 102. The second swing arm 10121 may be rotatably connected to the main shaft assembly 102 in a virtual axis manner. During specific implementation, as shown in FIG. 7, the base 1021 may be provided with a fourth arc-shaped groove 10214. In addition, refer to both FIG. 4 and FIG. 15. FIG. 15 may also show a structure of the second swing arm 10121. A second arc-shaped rotating block 101211 is disposed at an end that is of the second swing arm 10121 and that faces the base 1021. The second arc-shaped rotating block 101211 may be but is not limited to a circular arc-shaped rotating block, and the fourth arc-shaped groove 10214 may be but is not limited to a circular arc-shaped groove. In this case, the second arc-shaped rotating block 101211 may be accommodated in the fourth arc-shaped groove 10214, and may slide along a groove surface of the fourth arc-shaped groove 10214, so that the second swing arm 10121 can rotate around the base 1021 by sliding of the second arc-shaped rotating block 101211 along the groove surface of the fourth arc-shaped groove 10214. This can help reduce space occupied by the second swing arm 10121 on the main shaft assembly 102, help reduce a volume of the rotating module 101, and implement a miniaturization design of the hinge mechanism 1. It may be understood that, for an outward folded electronic device, when the second swing arm 10121 is rotatably connected to the main shaft assembly 102 in the virtual axis manner, an axis center of rotation of the second swing arm 10121 around the main shaft assembly 102 is located on a side that is of the hinge mechanism and that is away from the flexible display.

In addition, in this disclosure, the second arc-shaped rotating block 101211 may be but is not limited to a circular arc-shaped rotating block, and the fourth arc-shaped groove 10214 may be but is not limited to a circular arc-shaped groove. It may be understood that, when the second arc-shaped rotating block 101211 is the circular arc-shaped rotating block, a surface that is of the second arc-shaped rotating block 101211 and that is in contact with the groove surface of the fourth arc-shaped groove 10214 may be a circular arc-shaped surface, the groove surface of the fourth arc-shaped groove 10214 is also a circular arc-shaped surface, and circle centers of the two circular arc-shaped surfaces coincide.

In this disclosure, to improve stability of rotation of the second swing arm 10121 around the main shaft assembly 102, as shown in FIG. 8, the cover plate 1022 further includes a fourth protruding part 10225 disposed facing the fourth arc-shaped groove 10214, at least a part of the second arc-shaped rotating block 101211 is located between the fourth protruding part 10225 and the fourth arc-shaped groove 10214, and a surface that is of the second arc-shaped rotating block 101211 and that faces the fourth protruding part 10225 may be in contact with a surface 102251 of the fourth protruding part. This can limit the second arc-shaped rotating block 101211 between the cover plate 1022 and the base 1021, and effectively improve stability of rotation of second arc-shaped rotating block 101211 relative to the base 1021. In addition, when the groove surface of the fourth arc-shaped groove 10214 is a circular arc-shaped surface, a part that is of the surface 102251 of the fourth protruding part and that is in contact with the second arc-shaped rotating block 101211 may also be a circular arc-shaped surface, and circle centers of the two-circular arc-shaped surfaces coincide. In this disclosure, the surface that is of the second arc-shaped rotating block 101211 and that faces the fourth protruding part 10225 may be a plane or a circular arc-shaped surface, provided that when the second arc-shaped rotating block 101211 slides along the groove surface of the fourth arc-shaped groove 10214, the second arc-shaped rotating block 101211 can rotate relative to the fourth protruding part 10225.

To improve reliability of a connection between the second swing arm 10121 and the base 1021, the second arc-shaped rotating block 101211 may be further provided with a second concave part 1012111, and an opening of the second concave part 1012111 is disposed facing the cover plate 1022. In addition, a second plug part may be disposed at an end part that is of the cover plate 1022 and that faces the second housing fastening bracket 1014. In the closed state, the second plug part may be plugged into the second concave part 1012111, and a surface that is of the second plug part and that faces the fourth arc-shaped groove 10214 abuts at least a part of a surface of the second concave part 1012111. This can limit a rotation position of the second arc-shaped rotating block 101211, and prevent the second arc-shaped rotating block 101211 from falling out of the fourth arc-shaped groove 10214.

It should be noted that, in this disclosure, in addition to being rotatably connected to the main shaft assembly 102 in the virtual axis manner, the second swing arm 10121 may alternatively be rotatably connected to the main shaft assembly 102 in a solid axis manner that enables a connection between the first swing arm 10111 and the main shaft assembly 102 to be reliable. For an outward folded electronic device, when the second swing arm 10121 is rotatably connected to the main shaft assembly 102 in the solid axis manner, an axis center of rotation of the second swing arm 10121 around the main shaft assembly 102 is also located on the side that is of the hinge mechanism and that is away from the flexible display.

When the second connector 10123 is rotatably connected to the second swing arm 10121 through the third rotating shaft 101231, still refer to FIG. 15. The second arc-shaped rotating block 101211 is provided with a second mounting groove 1012112, a groove opening of the second mounting groove 1012112 is disposed facing the fourth arc-shaped groove 10214. In this case, the third rotating shaft 101231 may be mounted in the second mounting groove 1012112, a part of a surface of the third rotating shaft 101231 may be in contact with a groove surface of the second mounting groove 1012112, and a part of a surface of the third rotating shaft 101231 is in contact with the groove surface of the fourth arc-shaped groove 10214, to limit the third rotating shaft 101231 in the second mounting groove 1012112.

As shown in FIG. 15, in this disclosure, the groove surface of the second mounting groove 1012112 may include a fifth circular arc-shaped surface 10121121, a surface that is of the third rotating shaft 101231 shown in FIG. 10 and that is in contact with the groove surface of the second mounting groove 1012112 is a sixth circular arc-shaped surface 1012311, and a circle center of the fifth circular arc-shaped surface 10121121 coincides with a circle center of the sixth circular arc-shaped surface 1012311. In addition, the groove surface of the fourth arc-shaped groove 10214 is a seventh circular arc-shaped surface 102141, a surface that is of the third rotating shaft 101231 and that is in contact with the groove surface of the fourth arc-shaped groove 10214 may be an eighth circular arc-shaped surface 1012312, and a circle center of the seventh circular arc-shaped surface 102141 coincides with a circle center of the eighth circular arc-shaped surface 1012312. In this way, when the third rotating shaft 101231 slides along the groove surface of the fourth arc-shaped groove 10214 with the second arc-shaped rotating block 101211, the third rotating shaft 101231 may further rotate relative to the second arc-shaped rotating block 101211, so that the second connector 10123 can move relative to the main shaft assembly 102.

In this embodiment of this disclosure, when the second connector 10123 is rotatably connected to the second support arm 10122 through the fourth rotating shaft 101232, the fourth rotating shaft 101232 may pass through both the second connector 10123 and the second support arm 10122. In this way, a connection manner between the second connector 10123 and the second support arm 10122 is simple, a structure of the second rotating assembly 1012 is simplified, and the structure of the hinge mechanism 1 is further simplified.

It may be understood that, in the hinge mechanism 1 provided in this embodiment of this disclosure, the second connector 10123 may include a plurality of second sub-connectors that is sequentially rotatably connected. In addition, the plurality of second sub-connectors may be located between the second swing arm 10121 and the second support arm 10122. In this case, the second swing arm 10121 may be rotatably connected to an adjacent second sub-connector, and the second support arm 10122 may be rotatably connected to an adjacent second sub-connector. For a specific manner of a rotating connection between the second swing arm 10121 and the adjacent second sub-connector and a specific manner of a rotating connection between the second support arm 10122 and the adjacent second sub-connector, refer to the foregoing descriptions of a rotating connection between the second swing arm 10121 and the second connector 10123 and a rotating connection between the second support arm 10122 and the second connector. Details are not described herein again. In this disclosure, the second connector 10123 is disposed as the plurality of second sub-connectors that is sequentially rotatably connected, so that the second swing arm 10121 is rotatably connected to the second support arm 10122 through the plurality of second sub-connectors. This can effectively improve uniformity between a speed at which the second swing arm 10121 rotates around the main shaft assembly 102 and a speed at which the second support arm 10122 rotates around the main shaft assembly 102, and improve smoothness of movement and mutual pulling between the second swing arm 10121 and the second support arm 10122.

Still refer to FIG. 4. In this embodiment of this disclosure, the first rotating assembly 1011 is located between the first housing fastening bracket 1013 and the second housing fastening bracket 1014. The first swing arm 10111 is slidably connected to the first housing fastening bracket 1013, and during specific implementation, the first housing fastening bracket 1013 is provided with a first sliding slot 10131. The first sliding slot 10131 extends in a first direction, and the first swing arm 10111 may be mounted in the first sliding slot 10131 and may slide in the first sliding slot 10131 in the first direction. The first direction may be a direction in which the first housing fastening bracket 1013 moves toward or away from the base 1021. In addition, to prevent the first swing arm 10111 from falling off from the first sliding slot 10131, a first slide rail may be disposed on a slot wall of the first sliding slot 10131, and a first sliding block is disposed on the first swing arm 10111. In this way, the first sliding block may be clamped on the first slide rail, and the first sliding block may slide along the first slide rail, to limit the first swing arm 10111 in the first sliding slot 10131. In addition, the first slide rail is disposed on the slot wall of the first sliding slot 10131, and the first slide rail can provide guidance for sliding of the first swing arm 10111 along the first sliding slot 10131, to improve stability of movement of the first swing arm 10111.

In this disclosure, the first support arm 10112 may be rotatably connected to the second housing fastening bracket 1014. During specific implementation, still refer to FIG. 4. The second housing fastening bracket 1014 is provided with a second mounting part 10142. An end part that is of the first support arm 10112 and that faces the second housing fastening bracket 1014 is mounted on the second mounting part 10142, and the end part that is of the first support arm 10112 and that faces the second housing fastening bracket 1014 is rotatably connected to the second mounting part 10142.

In this embodiment of this disclosure, a specific manner in which the end part that is of the first support arm 10112 and that faces the second housing fastening bracket 1014 is rotatably connected to the second mounting part 10142 is not limited. For example, still refer to FIG. 4. A first mounting hole may be disposed on the second mounting part 10142, and a second mounting hole is disposed on the end part that is of the first support arm 10112 and that faces the second housing fastening bracket 1014. In this case, an end part that is of the first support arm 10112 and that faces the first housing fastening bracket 1013 may be rotatably connected to the second mounting part 10142 through a hinge that passes through both the first mounting hole and the second mounting hole.

Figure 16:
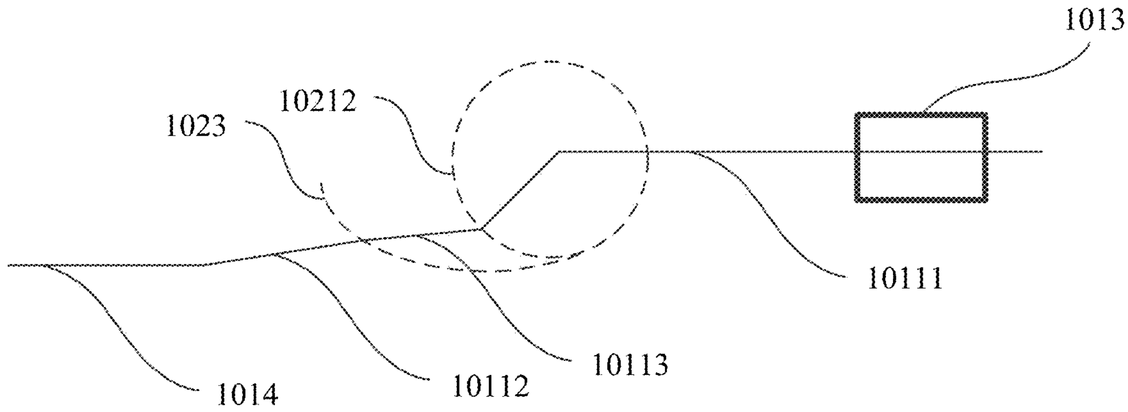
FIG. 16 is a diagram of a principle of a movement mechanism of a hinge mechanism according to an embodiment of this disclosure.

FIG. 16 is a diagram of a principle of a movement mechanism of the hinge mechanism according to an embodiment of this disclosure. Based on the hinge mechanism 1 provided in the foregoing embodiments of this disclosure, in the process in which the electronic device changes from the unfolded state to the closed state, the first housing fastening bracket 1013 and the second housing fastening bracket 1014 move in a direction close to each other, and when the first housing fastening bracket 1013 drives the first swing arm 10111 to rotate around the main shaft assembly 102 in a clockwise direction, the first swing arm 10111 may slide along the groove surface of the second arc-shaped groove 10212, to drive the first connector 10113 to move toward the first swing arm 10111 in the first track slot 1023 of the main shaft assembly 102. In addition, the first connector 10113 is rotatably connected to the first support arm 10112. Therefore, in a process in which the first connector 10113 moves toward the first swing arm 10111 in the first track slot 1023 of the main shaft assembly 102, the first support arm 10112 may be driven to rotate around the main shaft assembly 102 in a counterclockwise direction, to drive, through the first support arm 10112, the second housing fastening bracket 1014 to rotate around the main shaft assembly 102 in a counterclockwise direction. In the process in which the electronic device changes from the closed state to the unfolded state, the first housing fastening bracket 1013 and the second housing fastening bracket 1014 move in a direction away from each other, and when the first housing fastening bracket 1013 drives the first swing arm 10111 to rotate around the main shaft assembly 102 in a counterclockwise direction, the first swing arm 10111 may drive the first connector 10113 to move toward the first support arm 10112 in the first track slot 1023 of the main shaft assembly 102, to drive the first support arm 10112 to rotate around the main shaft assembly 102 in a clockwise direction, and drive, through the first support arm 10112, the second housing fastening bracket 1014 to rotate around the main shaft assembly 102 in a clockwise direction. In this way, folding and unfolding functions of the hinge mechanism 1 can be implemented.

According to the foregoing structural relationships, a cross section of the first connector 10113 may be made small, so that the first connector 10113 can move in the first track slot 1023 of the main shaft assembly 102. In addition, because there is enough space for the first connector 10113 to extend in a direction perpendicular to an axis, and there is a connection relationship between the first swing arm 10111 and the first support arm 10112, reliability of the hinge mechanism 1 can be ensured. This can not only reduce a thickness of the main shaft assembly 102 and a thickness of the entire electronic device, but also maintain reliability of the hinge mechanism 1. In this way, the entire hinge mechanism 1 is light, thin, and reliable.

In addition, the first connector 10113 may move in the first track slot 1023 according to a specified track. Therefore, uncontrolled movement of the first connector 10113 in an entire folding and unfolding process can be avoided, randomness of movement of the first housing fastening bracket 1013 and the second housing fastening bracket 1014 can be further avoided, and structure stability and stability of movement of the entire hinge mechanism 1 can be ensured. In some cases, the first track slot 1023 is properly designed, so that an outer tangent line of the hinge mechanism 1 may maintain a constant length in the entire folding and unfolding process, and a length of the flexible display that covers a surface of the hinge mechanism 1 can also basically remain unchanged. This can effectively avoid squeezing or pulling the flexible display, improve structural reliability of the flexible display, and further improve structural reliability of the electronic device.

Refer to FIG. 4 again. In this embodiment of this disclosure, the second swing arm 10121 may be slidably connected to the second housing fastening bracket 1014. During specific implementation, the second housing fastening bracket 1014 is provided with a second sliding slot 10141, and in the axial direction of the hinge mechanism 1, the second sliding slot 10141 and the second mounting part 10142 are disposed at an interval. The second sliding slot 10141 extends in a second direction, and the second swing arm 10121 may be mounted in the second sliding slot 10141 and may slide in the second sliding slot 10141 in the second direction. The second direction may be a direction in which the second housing fastening bracket 1014 moves toward or away from the base 1021. In addition, to prevent the second swing arm 10121 from falling off from the second sliding slot 10141, a second slide rail may be disposed on a slot wall of the second sliding slot 10141, and a second sliding block is disposed on the second swing arm 10121. In this way, the second sliding block may be clamped on the second slide rail, and the second sliding block may slide along the second slide rail, to limit the second swing arm 10121 in the second sliding slot 10141. In addition, the second slide rail is disposed on the slot wall of the second sliding slot 10141, and the second slide rail can provide guidance for sliding of the second swing arm 10121 along the second sliding slot 10141, to improve stability of movement of the second swing arm 10121.

In addition, the second support arm 10122 may be rotatably connected to the first housing fastening bracket 1013. During specific implementation, the first housing fastening bracket 1013 is provided with a first mounting part 10132, and the first mounting part 10132 and the first sliding slot 10131 are disposed at an interval in the axial direction of the hinge mechanism 1. An end part that is of the second support arm 10122 and that faces the first housing fastening bracket 1013 is mounted on the first mounting part 10132, and an end part that is of the second support arm 10122 and that faces the first housing fastening bracket 1013 is rotatably connected to the first mounting part 10132.

In this embodiment of this disclosure, a specific manner in which the end part that is of the second support arm 10122 and that faces the first housing fastening bracket 1013 is rotatably connected to the first mounting part 10132 is not limited. For example, still refer to FIG. 4. A third mounting hole may be disposed on the first mounting part 10132, and a fourth mounting hole is disposed on an end part that is of the second support arm 10122 and that faces the first housing fastening bracket 1013. In this case, the end part that is of the second support arm 10122 and that faces the first housing fastening bracket 1013 may be rotatably connected to the first mounting part 10132 through a hinge that passes through both the third mounting hole and the fourth mounting hole.

Based on the hinge mechanism 1 provided in the foregoing embodiments of this disclosure, in the process in which the electronic device changes from the unfolded state to the closed state, the first housing fastening bracket 1013 and the second housing fastening bracket 1014 move in a direction close to each other, and when the second housing fastening bracket 1014 drives the second swing arm 10121 to rotate around the main shaft assembly 102 in a counterclockwise direction, the second swing arm 10121 may drive the second connector 10123 to move toward the second swing arm 10121 in the second track slot 1024 of the main shaft assembly 102. In addition, the second connector 10123 is rotatably connected to the second support arm 10122. Therefore, in a process in which the second connector 10123 moves toward the second swing arm 10121 in the second track slot 1024 of the main shaft assembly 102, the second support arm 10122 may be driven to rotate around the main shaft assembly 102 in a clockwise direction, to drive, through the second support arm 10122, the first housing fastening bracket 1013 to rotate around the main shaft assembly 102 in a clockwise direction. In the process in which the electronic device changes from the closed state to the unfolded state, the first housing fastening bracket 1013 and the second housing fastening bracket 1014 move in a direction away from each other, and when the second housing fastening bracket 1014 drives the second swing arm 10121 to rotate around the main shaft assembly 102 in a clockwise direction, the second swing arm 10121 may drive the second connector 10123 to move toward the second support arm 10122 in the second track slot 1024 of the main shaft assembly 102, to drive the second support arm 10122 to rotate around the main shaft assembly 102 in a counterclockwise direction, and drive, through the second support arm 10122, the first housing fastening bracket 1013 to rotate around the main shaft assembly 102 in a counterclockwise direction. In this way, folding and unfolding functions of the hinge mechanism 1 can be implemented.

According to the foregoing structural relationships, a cross section of the second connector 10123 may be made small, so that the second connector 10123 can move in the second track slot 1024 of the main shaft assembly 102. In addition, because there is enough space for the second connector 10123 to extend in a direction perpendicular to an axis, and there is a connection relationship between the second swing arm 10121 and the second support arm 10122, reliability of the hinge mechanism 1 can be ensured. This can not only reduce a thickness of the main shaft assembly 102 and a thickness of the entire electronic device, but also maintain reliability of the hinge mechanism 1. In this way, the entire hinge mechanism 1 is light, thin, and reliable.

The second connector 10123 may move according to a specified track. Therefore, uncontrolled movement of the second connector 10123 in an entire folding and unfolding process can be avoided, randomness of movement of the first housing fastening bracket 1013 and the second housing fastening bracket 1014 can be further avoided, and structure stability and stability of movement of the entire hinge mechanism 1 can be ensured. In some cases, the second track slot 1024 is properly designed, so that an outer tangent line of the hinge mechanism 1 may maintain a constant length in the entire folding and unfolding process, and a length of the flexible display that covers a surface of the hinge mechanism 1 can also basically remain unchanged. This can effectively avoid squeezing or pulling the flexible display, improve structural reliability of the flexible display, and further improve structural reliability of the electronic device.

After the first rotating assembly and the second rotating assembly of the hinge mechanism are described, the following further describes the support assembly in detail.

Figure 17:
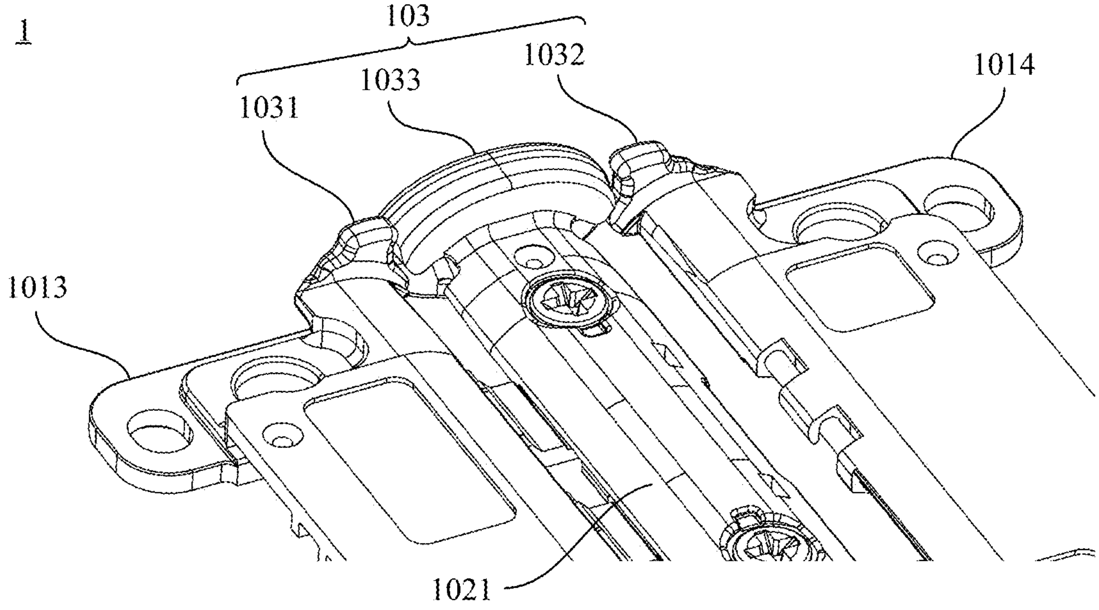
FIG. 17 is a diagram of a partial structure of a hinge mechanism according to an embodiment of this disclosure.

FIG. 17 is a diagram of a partial structure of the hinge mechanism 1 according to an embodiment of this disclosure. Refer to both FIG. 4 and FIG. 17. In this embodiment of this disclosure, the support assembly 103 may include a first support part 1031, a second support part 1032, and a third support part 1033. The first support part 1031 may be disposed at an end part of the first housing fastening bracket 1013 in the axial direction of the hinge mechanism 1, and the first support part 1031 is located on a side that is of the first housing fastening bracket 1013 and that is close to the base 1021. The second support part 1032 may be disposed at an end part of the second housing fastening bracket 1014 in the axial direction of the hinge mechanism 1, and the second support part 1032 is located on a side of the second housing fastening bracket 1014 close to the base 1021. The third support part 1033 is disposed at an end part of the base 1021 in the axial direction of the hinge mechanism 1, that is, the third support part 1033 is located between the first support part 1031 and the second support part 1032.

Figure 18:
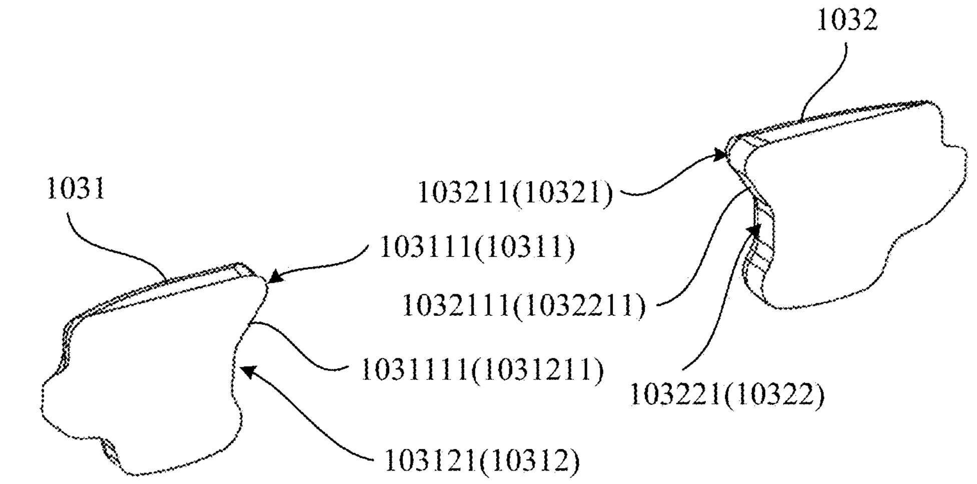
FIG. 18 is a diagram of structures of both a first support part and a second support part according to an embodiment of this disclosure.
Figure 19:
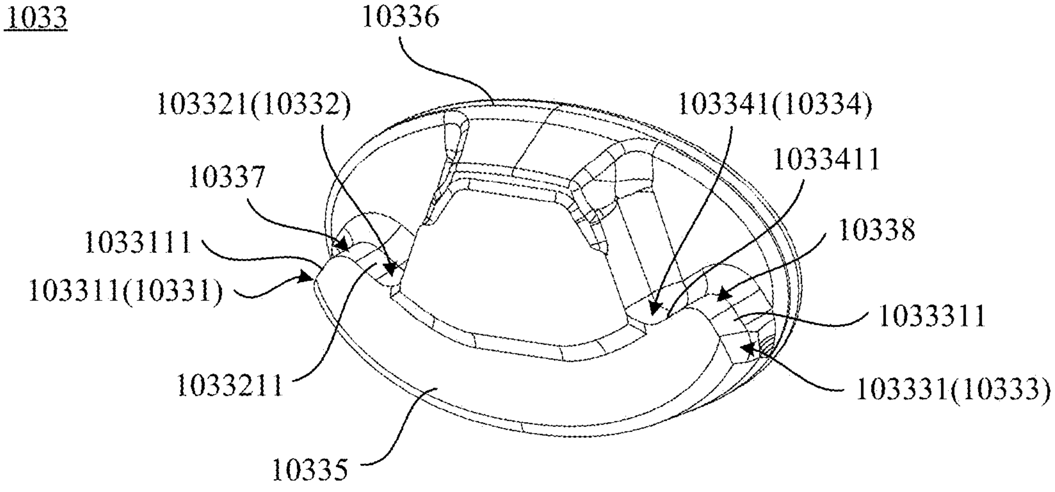
FIG. 19 is a diagram of a structure of a third support part according to an embodiment of this disclosure.

FIG. 18 is a diagram of structures of both the first support part 1031 and the second support part 1032 according to an embodiment of this disclosure. FIG. 19 is a diagram of a structure of the third support part 1033 according to an embodiment of this disclosure. Refer to FIG. 17 to FIG. 19. The first support part 1031 may be provided with a first protrusion 10311 and a first groove 10312, and the second support part 1032 may be provided with a second protrusion 10321 and a second groove 10322. Correspondingly, a third protrusion 10331 and a third groove 10332 may be disposed on a side that is of the third support part 1033 and that is close to the first housing fastening bracket 1013, and a fourth protrusion 10333 and a fourth groove 10334 may be disposed on a side that is of the third support part 1033 and that is close to the second housing fastening bracket 1014.

Figure 20:
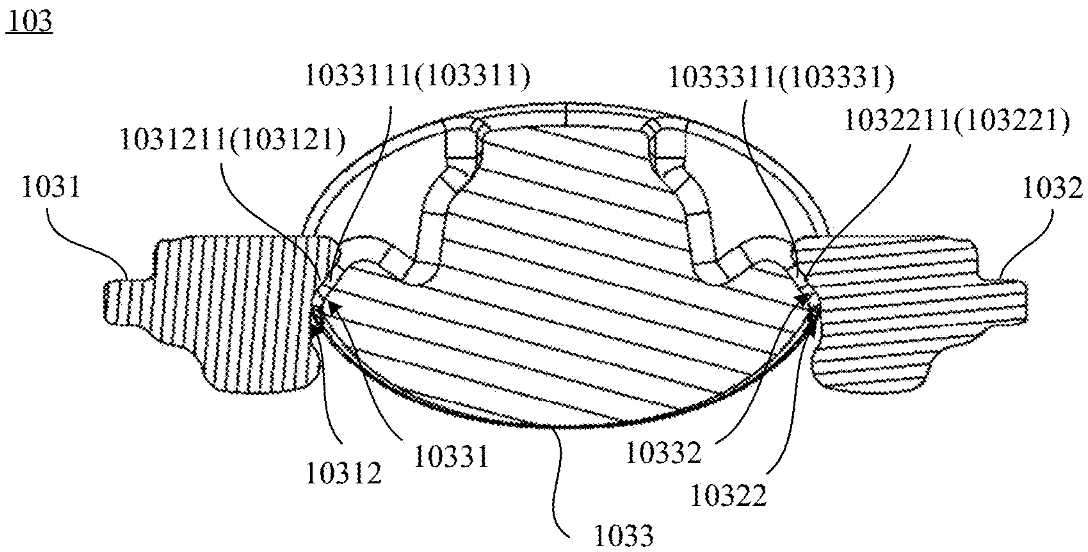
FIG. 20 is a diagram of a structure of a support assembly of a hinge mechanism in an unfolded state according to an embodiment of this disclosure.

FIG. 20 is a diagram of a relative position relationship between the first support part 1031, the second support part 1032, and the third support part 1033 of the hinge mechanism in the unfolded state according to an embodiment of this disclosure. Refer to both FIG. 17 and FIG. 20. In this embodiment of this disclosure, when the hinge mechanism 1 is in the unfolded state, the third protrusion 10331 of the third support part 1033 is limited in the first groove 10312 of the first support part 1031, and the fourth protrusion 10333 of the third support part 1033 is limited in the second groove 10322 of the second support part 1032. In this way, at least horizontal positioning can be implemented on the first support part 1031, the second support part 1032, and the third support part 1033 through fitting between the third protrusion 10331 and the first groove 10312 and fitting between the fourth protrusion 10333 and the second groove 10322. This can reduce a risk that the first support part 1031 and the second support part 1032 are horizontally displaced, and further reduce a risk that the first housing fastening bracket 1013 and the second housing fastening bracket 1014 are horizontally misplaced relative to the base 1021 in the unfolded state. A horizontal direction may be understood as an arrangement direction of the first housing fastening bracket 1013 and the second housing fastening bracket 1014 on two sides of the base 1021.

Figure 21:
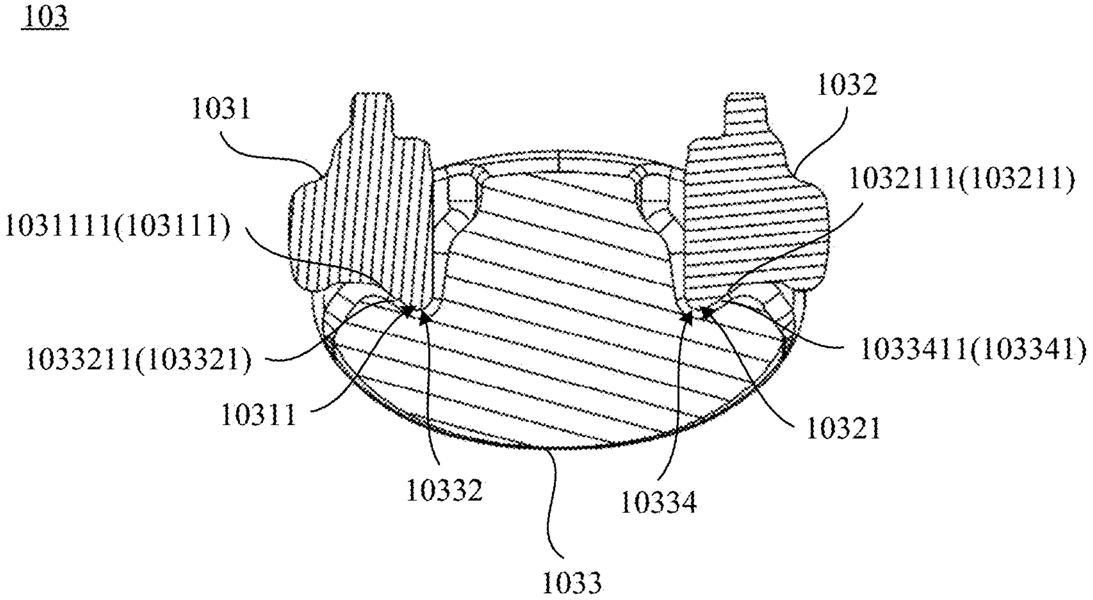
FIG. 21 is a diagram of a structure of a support assembly of a hinge mechanism in a closed state according to an embodiment of this disclosure.

FIG. 21 is a diagram of a relative position relationship between the first support part 1031, the second support part 1032, and the third support part 1033 of the hinge mechanism in the closed state according to an embodiment of this disclosure. Refer to both FIG. 17 and FIG. 21. When the hinge mechanism 1 is in the closed state, the first protrusion 10311 of the first support part 1031 is limited in the third groove 10332 of the third support part 1033, and the second protrusion 10321 of the second support part 1032 is limited in the fourth groove 10334 of the third support part 1033. In this way, at least horizontal positioning can be implemented on the first support part 1031 and the second support part 1032 through fitting between the first protrusion 10311 and the third groove 10332 and fitting between the second protrusion 10321 and the fourth groove 10334. This can reduce a risk that the first support part 1031 and the second support part 1032 are horizontally displaced, and further reduce a risk that the first housing fastening bracket 1013 and the second housing fastening bracket 1014 are horizontally misplaced relative to the base 1021 in the closed state.

In addition, it should be understood that a fitting surface between a groove and a protrusion is not a plane. Fitting between the third protrusion 10331 and the first groove 10312 is used as an example. When the third protrusion 10331 is limited in the first groove 10312, it may be obtained that the first groove 10312 surrounds or partially surrounds the third protrusion 10331, and a contact surface between the first groove 10312 and the third protrusion 10331 is a curved surface including a plurality of planes facing different directions. Correspondingly, the contact surface between the third protrusion 10331 and the first groove 10312 also includes the plurality of planes facing different directions, and each plane of the third protrusion 10331 abuts each plane of the first groove 10312, to limit the first support part 1031 in the plurality of directions including a horizontal direction. In this way, degrees of freedom of the first support part 1031 in the plurality of directions can be effectively limited, that is, degrees of freedom of the first housing fastening bracket in the plurality of directions can be limited. However, a hinge mechanism usually does not have a related support structure, and when an electronic device in which the hinge mechanism is used falls or collides, a housing fastening bracket of the electronic device is easily displaced relative to a main shaft assembly. As a result, misplacement occurs. The hinge mechanism provided in this embodiment of this disclosure uses fitting between a protrusion and a groove, so that regardless of whether an electronic device in which the hinge mechanism is used is in an unfolded state or a closed state, a risk that a housing fastening bracket is misplaced relative to a main shaft assembly when the electronic device falls or collides can be effectively reduced, and a structural stability of the hinge mechanism can be improved.

Refer to FIG. 19 to FIG. 21. In this embodiment of this disclosure, the third support part 1033 may include a main body 10335 and a baffle plate 10336. The baffle plate 10336 may be located on a side that is of the main body 10335 and that is away from the base, and the third protrusion 10331, the third groove 10332, the fourth protrusion 10333, and the fourth groove 10334 are all disposed on the main body 10335. A plane perpendicular to the axial direction of the hinge mechanism is defined as a first plane. When the hinge mechanism is in the unfolded state, a projection of the baffle plate 10336 on the first plane covers a projection of at least a part of the first support part 1031 on the first plane, and covers a projection of at least a part of the second support part 1032 on the first plane, that is, the baffle plate 10336 overlaps with the first support part 1031 and the second support part 1032 in a direction perpendicular to the axial direction of the hinge mechanism. This design can implement positioning on the first support part 1031 and the second support part 1032 in the axial direction, reduce a risk that the first support part 1031 and the second support part 1032 are displaced in the axial direction, and further reduce a risk that the first housing fastening bracket and the second housing fastening bracket are misplaced relative to the base in the axial direction when the hinge mechanism is in the unfolded state.

Similarly, when the hinge mechanism is in the closed state and in a process in which the hinge mechanism switches from the closed state to the unfolded state or switches from the unfolded state to the closed state, a projection of the baffle plate 10336 on the first plane may also cover a projection of at least a part of the first support part 1031 on the first plane, and cover a projection of at least a part of the second support part 1032 on the first plane. This can reduce a risk that the first housing fastening bracket and the second housing fastening bracket are misplaced relative to the base in the axial direction in the process in which the hinge mechanism switches from the closed state to the unfolded state or switches from the unfolded state to the closed state.

In a specific implementation, the main body 10335 and the baffle plate 10336 of the third support part 1033 may be of an integrated structure. This can help improve structural strength of the third support part 1033, and reduce assembly difficulty of the hinge mechanism.

Still refer to FIG. 19 to FIG. 21. In some embodiments, a groove wall of the first groove 10312 may include a first concave curved surface 103121, and correspondingly, a surface of the third protrusion 10331 may include a third convex curved surface 103311 whose shape is consistent with that of the first concave curved surface 103121. In this way, adaptation between the surface of the third protrusion 10331 and the groove wall of the first groove 10312 can be increased, the third protrusion 10331 is prevented from moving in the first groove 10312, and a risk that the first housing fastening bracket is misplaced relative to the base in the unfolded state can be further reduced.

For example, the first concave curved surface 103121 and the third convex curved surface 103311 each include an arc-shaped surface, an inclined surface, or a combined curved surface formed through a connection between an arc-shaped surface and an inclined surface. For example, in a specific implementation, the first concave curved surface

103121 may include a first inclined surface 1031211, the third convex curved surface 103311 may include a third inclined surface 1033111, and in a direction that points from the third protrusion 10331 to the fourth protrusion 10333 (that is, a horizontal direction that points from the first housing fastening bracket to the second housing fastening bracket), the third inclined surface 1033111 of the third convex curved surface 103311 may gradually tilt in a direction away from a support surface of the main shaft assembly. When the electronic device is in the unfolded state, the third protrusion 10331 is limited in the first groove 10312, and the third inclined surface 1033111 of the third convex curved surface 103311 is parallel to and abuts the first inclined surface 1031211 of the first concave curved surface 103121. If the electronic device falls or collides in the unfolded state, fitting between the first groove 10312 and the third protrusion 10331 may be used to implement horizontal positioning on the first support part 1031. In addition, the first support part 1031 may be effectively prevented from moving toward the support surface of the main shaft assembly by using the third inclined surface 1033111 of the third convex curved surface 103311, that is, the first housing fastening bracket is prevented from moving toward the flexible display. This can prevent the first housing fastening bracket from squeezing the flexible display, and reduce a risk of damaging the flexible display.

Similarly, a groove wall of the second groove 10322 includes a second concave curved surface 103221, and correspondingly, a surface of the fourth protrusion 10333 may include a fourth convex curved surface 103331 whose shape is consistent with that of the second concave curved surface 103221. In this way, adaptation between the surface of the fourth protrusion 10333 and the groove wall of the second groove 10322 can be increased, the fourth protrusion 10333 is prevented from moving in the second groove 10322, and a risk that the second housing fastening bracket is misplaced relative to the base in the unfolded state can be further reduced.

Similarly, the second concave curved surface 103221 and the fourth convex curved surface 103331 each include an arc-shaped surface, an inclined surface, or a combined curved surface formed through a connection between an arc-shaped surface and an inclined surface. For example, in a specific implementation, the second concave curved surface 103221 may include a second inclined surface 1032211, the fourth convex curved surface 103331 may include a fourth inclined surface 1033311, and in a direction that points from the fourth protrusion 10333 to the third protrusion 10331 (that is, a horizontal direction that points from the second housing fastening bracket to the first housing fastening bracket), the fourth inclined surface 1033311 of the fourth convex curved surface 103331 gradually tilts in a direction away from the support surface of the main shaft assembly. When the electronic device is in the unfolded state, the fourth protrusion 10333 is limited in the second groove 10322, and the fourth inclined surface 1033311 of the fourth convex curved surface 103331 is parallel to and abuts the second inclined surface 1032211 of the second concave curved surface 103221. If the electronic device falls or collides in the unfolded state, fitting between the second groove 10322 and the fourth protrusion 10333 may be used to implement horizontal positioning on the second support part 1032. In addition, the second support part 1032 may be effectively prevented from moving toward the support surface of the main shaft assembly by using the fourth inclined surface 1033311 of the fourth convex curved surface 103331, that is, the second housing fastening bracket is prevented from moving toward the flexible display. This can prevent the second housing fastening bracket from squeezing the flexible display, and reduce a risk of damaging the flexible display.

In some embodiments, a groove wall of the third groove 10332 may include a third concave curved surface 103321, and correspondingly, a surface of the first protrusion 10311 may include a first convex curved surface 103111 whose shape is consistent with that of the third concave curved surface 103321. In this way, adaptation between the surface of the first protrusion 10311 and the groove wall of the third groove 10332 can be increased, the first protrusion 10311 is prevented from moving in the third groove 10332, and a risk that the first housing fastening bracket is misplaced relative to the base in the closed state can be further reduced.

For example, the third concave curved surface 103321 and the first convex curved surface 103111 each include an arc-shaped surface, an inclined surface, or a combined curved surface formed through a connection between an arc-shaped surface and an inclined surface. For example, in a specific implementation, the first convex curved surface 103111 may include a first inclined surface 1031111, the third concave curved surface 103321 may correspondingly include a third inclined surface 1033211, and in a direction that points from the third groove 10332 to the fourth groove 10334 (that is, a horizontal direction that points from the first housing fastening bracket to the second housing fastening bracket), the third inclined surface 1033211 of the third concave curved surface 103321 may gradually tilt in a direction close to the support surface of the main shaft assembly. When the electronic device is in the closed state, the first protrusion 10311 is limited in the third groove 10332, and the first inclined surface 1031111 of the first convex curved surface 103111 is parallel to and abuts the third inclined surface 1033211 of the third concave curved surface 103321. If the electronic device falls or collides in the closed state, the third inclined surface 1033211 of the third concave curved surface 103321 may be used to effectively prevent the first support part 1031 from moving in a direction away from the third support part 1033, that is, prevent the first housing fastening bracket from moving in a direction away from the main shaft assembly, to reduce a risk of failure of another component caused by extension of the first housing fastening bracket.

It should be noted that, for the first support part 1031, the first convex curved surface 103111 of the first protrusion 10311 and the first concave curved surface 103121 of the first groove 10312 may be adjacent and connected to each other in a circumferential direction of the first support part. In this case, the first inclined surface 1031111 of the first convex curved surface 103111 and the first inclined surface 1031211 of the first concave curved surface 103121 may be a same inclined surface. This design can help simplify an outline structure of the first support part 1031, and reduce processing difficulty of the first support part.

Similarly, a groove wall of the fourth groove 10334 may include a fourth concave curved surface 103341, and correspondingly, a surface of the second protrusion 10321 may include a second convex curved surface 103211 whose shape is consistent with that of the fourth concave curved surface 103341. In this way, adaptation between the surface of the second protrusion 10321 and the groove wall of the fourth groove 10334 can be increased, the second protrusion 10321 is prevented from moving in the fourth groove 10334, and a risk that the second housing fastening bracket is misplaced relative to the base in the closed state can be further reduced.

Similarly, the fourth concave curved surface 103341 and the second convex curved surface 103211 each include an arc-shaped surface, an inclined surface, or a combined curved surface formed through a connection between an arc-shaped surface and an inclined surface. For example, in a specific implementation, the second convex curved surface 103211 may include a second inclined surface 1032111, the fourth concave curved surface 103341 may include a fourth inclined surface 1033411, and in a direction that points from the fourth groove 10334 to the third groove 10332 (that is, a horizontal direction that points from the second housing fastening bracket to the first housing fastening bracket), the fourth inclined surface 1033411 of the fourth concave curved surface 103341 may gradually tilt in a direction close to the support surface of the main shaft assembly. When the electronic device is in the closed state, the second protrusion 10321 is limited in the fourth groove 10334, and the second inclined surface 1032111 of the second convex curved surface 103211 is parallel to and abuts the fourth inclined surface 1033411 of the fourth concave curved surface 103341. If the electronic device falls or collides in the closed state, the fourth inclined surface 1033411 of the fourth concave curved surface 103341 may be used to effectively prevent the second support part 1032 from moving in a direction away from the third support part 1033, that is, prevent the second housing fastening bracket from moving in a direction away from the main shaft assembly, to reduce a risk of failure of another component caused by extension of the second housing fastening bracket.

It should be noted that, for the second support part 1032, the second convex curved surface 103211 of the second protrusion 10321 and the second concave curved surface 103221 of the second groove 10322 may be adjacent and connected to each other in a circumferential direction of the second support part 1032. In this case, the second inclined surface 1032111 of the second convex curved surface 103211 and the second inclined surface 1032211 of the second concave curved surface 103221 may be a same inclined surface. This design can help simplify an outline structure of the second support part 1032, and reduce processing difficulty of the second support part 1032.

Refer to FIG. 19 to FIG. 21. In this embodiment of this disclosure, the surface of the third protrusion 10331 may be connected to the groove wall of the third groove 10332 through a first connection arc-shaped surface 10337. In this way, when the hinge mechanism switches from the unfolded state to the closed state, driven by the first housing fastening bracket, the first protrusion 10311 of the first support part 1031 may smoothly transit to the third groove 10332 of the third support part 1033 under guiding effect of the first connection arc-shaped surface 10337. This can reduce a risk that the first support part 1031 and the third support part 1033 are stuck in a switching process, and further improve smoothness of rotation of the first housing fastening bracket relative to the base. On the contrary, when the hinge mechanism switches from the closed state to the unfolded state, driven by the first housing fastening bracket, the first groove 10312 of the first support part 1031 may smoothly transit to a periphery of the third protrusion 10331 of the third support part 1033 under the guiding effect of the first connection arc-shaped surface 10337, to accommodate the third protrusion 10331 in the first groove 10312. This can reduce a risk that the first support part 1031 and the third support part 1033 are stuck in a switching process, and further improve smoothness of rotation of the first housing fastening bracket relative to the base.

Based on a same principle, the surface of the fourth protrusion 10333 may be connected to the groove wall of the fourth groove 10334 through a second connection arc-shaped surface 10338. In this way, when the hinge mechanism switches from the unfolded state to the closed state, driven by the second housing fastening bracket, the second protrusion 10321 of the second support part 1032 may smoothly transit to the fourth groove 10334 of the third support part 1033 under guiding effect of the second connection arc-shaped surface 10338. This can reduce a risk that the second support part 1032 and the third support part 1033 are stuck in a switching process, and improve smoothness of rotation of the second housing fastening bracket relative to the base. On the contrary, when the hinge mechanism switches from the closed state to the unfolded state, driven by the second housing fastening bracket, the second groove 10322 of the second support part 1032 may smoothly transit to a periphery of the fourth protrusion 10333 of the third support part 1033 under the guiding effect of the second connection arc-shaped surface 10338, to accommodate the fourth protrusion 10333 in the second groove 10322. This can reduce a risk that the second support part 1032 and the third support part 1033 are stuck in a switching process, and improve smoothness of rotation of the second housing fastening bracket relative to the base.

It can be learned that, the foregoing structural design is used, so that when the electronic device is in the unfolded state or the closed state, the third support part 1033 can implement concave-convex fitting with the first support part 1031 and the second support part 1032, to limit relative positions between the first housing fastening bracket and the base and between the second housing fastening bracket and the base. This can reduce a risk that the first housing and the second housing are misplaced relative to the hinge mechanism, and improve reliability of the electronic device.

Certainly, in some other embodiments, a position relationship between the flexible display and the first protrusion 10311 and the first groove 10312 of the first support part 1031, a position relationship between the flexible display and the third protrusion 10331 and the third groove 10332 of the third support part 1033, a position relationship between the flexible display and the second protrusion 10321 and the second groove 10322 of the second support part 1032, and a position relationship between the flexible display and the fourth protrusion 10333 and the fourth groove 10334 of the third support part 1033 may be changed, so that a fitting relationship opposite to that in the foregoing embodiments may also be used between the first support part 1031 and the third support part 1033, and between the second support part 1032 and the third support part 1033. For example, when the hinge mechanism is in the unfolded state, the first protrusion 10311 of the first support part 1031 is limited in the third groove 10332 of the third support part 1033, and the second protrusion 10321 of the second support part 1032 is limited in the fourth groove 10334 of the third support part 1033, and when the hinge mechanism is in the closed state, the third protrusion 10331 of the third support part 1033 is limited in the first groove 10312 of the first support part 1031, and the fourth protrusion 10333 of the third support part 1033 is limited in the second groove 10322 of the second support part 1032. This design can also limit a relative relationship between the first housing fastening bracket and the base and a relative relationship between the second housing fastening bracket and the base. Details are not described herein again.

Refer to FIG. 17 again. In this embodiment of this disclosure, the first support part 1031 and the first housing fastening bracket 1013 may be of an integrated structure, that is, the first support part 1031 may be directly formed at an end part of the first housing fastening bracket 1013. This can improve strength of a connection between the first support part 1031 and the first housing fastening bracket 1013, and reduce assembly difficulty of the hinge mechanism 1. Certainly, in some other embodiments, the first support part 1031 may alternatively be fastened to the first housing fastening bracket 1013 through welding, bonding, or the like. This split design can help reduce processing difficulty of the first support part 1031 and the first housing fastening bracket 1013.

Similarly, the second support part 1032 and the second housing fastening bracket 1014 may use an integrated design, or may use a split design, and the third support part 1033 and the base 1021 may use an integrated design, or may use a split design.

In addition, there may be two first support parts 1031, two second support parts 1032, and two third support parts 1033 respectively. The two first support parts 1031 may be respectively disposed at two ends of the first housing fastening bracket 1013 in the axial direction of the hinge mechanism 1, the two second support parts 1032 may be respectively disposed at two ends of the second housing fastening bracket 1014 in the axial direction of the hinge mechanism 1, and the two third support parts 1033 may be respectively disposed at two ends of the base 1021 in the axial direction of the hinge mechanism 1. In this way, the support assembly 103 can limit the first housing fastening bracket 1013 and the second housing fastening bracket 1014 at both ends of the hinge mechanism 1. This can further reduce a risk that the first housing fastening bracket 1013 and the first housing, and the second housing fastening bracket 1014 and the second housing are misplaced relative to the base, and improve structural reliability of the electronic device in a scenario such as falling or collision.

Figure 22:
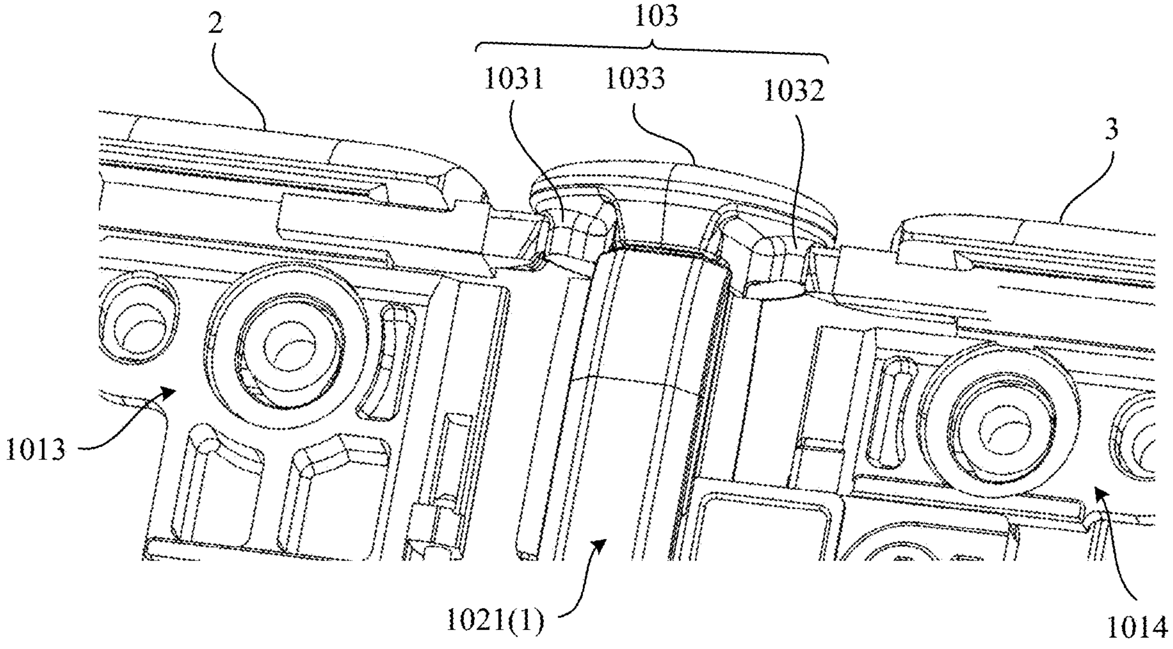
FIG. 22 is a diagram of a structure of another electronic device according to an embodiment of this disclosure.

FIG. 22 is a diagram of a structure of another electronic device according to an embodiment of this disclosure. Refer to FIG. 22. In this embodiment of this disclosure, the electronic device includes a hinge mechanism 1, a first housing 2, and a second housing 3. Similar to the foregoing embodiments, the hinge mechanism may include a base 1021, a first housing fastening bracket 1013, a second housing fastening bracket 1014, and one or more rotating modules. The first housing fastening bracket 1013 is fastened to the first housing 2. The second housing fastening bracket 1014 is fastened to the second housing 3. Each rotating module may include a first rotating assembly and a second rotating assembly. For specific structures of both the first rotating assembly and the second rotating assembly, a connection manner between the first rotating assembly and the first housing fastening bracket 1013, and a connection manner between the second rotating assembly and the second housing fastening bracket 1014, refer to embodiments shown in FIG. 4 to FIG. 16. Details are not described herein again.

In this embodiment of this disclosure, the electronic device may also include a support assembly 103, and the support assembly 103 includes a first support part 1031, a second support part 1032, and a third support part 1033. Different from the foregoing embodiments, in this embodiment, the first support part 1031 and the second support part 1032 are not disposed on the first housing fastening bracket 1013 and the second housing fastening bracket 1014 of the hinge mechanism 1. Instead, the first support part 1031 and the second support part 1032 are directly disposed on the first housing 2 and the second housing 3 of the electronic device. Further, the first support part 1031 may be disposed at an end part of the first housing 2 in an axial direction of the hinge mechanism 1, and the first support part 1031 is located on a side that is of the first housing 2 and that is close to the base 1021, the second support part 1032 may be disposed at an end part of the second housing 3 in the axial direction of the hinge mechanism 1, and the second support part 1032 is located on a side that is of the second housing 3 and that is close to the base 1021, and the third support part 1033 may be disposed at an end part of the base 1021 in the axial direction of the hinge mechanism 1.

Similar to this embodiment, the first housing 2 may include a first middle frame and a first cover that covers a side that is of the first middle frame and that is away from a flexible display, and the second housing 3 may include a second middle frame and a second cover that covers a side that is of the second middle frame and that is away from the flexible display. In this embodiment of this disclosure, the first support part 1031 and the second support part 1032 may be respectively disposed on the first middle frame and the second middle frame.

In a specific implementation, the first support part 1031 may be provided with a first protrusion and a first groove, and the second support part 1032 may be provided with a second protrusion and a second groove. Correspondingly, a third protrusion and a third groove may be disposed on a side that is of the third support part 1033 and that is close to the first housing 2, and a fourth protrusion and a fourth groove may be disposed on a side that is of the third support part 1033 and that is close to the second housing 3. For a concave-convex surface design of the first support part 1031, a concave-convex surface design of the second support part 1032, and a concave-convex surface design of the third support part 1033, refer to the foregoing embodiments. Details are not described herein again.

In an embodiment, when the electronic device is in an unfolded state, the third protrusion of the third support part 1033 is limited in the first groove of the first support part 1031, and the fourth protrusion of the third support part 1033 is limited in the second groove of the second support part 1032, and when the electronic device is in a closed state, the first protrusion of the first support part 1031 is limited in the third groove of the third support part 1033, and the second protrusion of the second support part 1032 is limited in the fourth groove of the third support part 1033. In this embodiment, when the electronic device is in the unfolded state and the closed state, relative positions between the first housing 2 and the base 1021 and between the second housing 3 and the base 1021 may be limited through concave-convex fitting between the third support part 1033 and the first support part 1031 and the second support part 1032, to reduce a risk that the first housing 2 and the second housing 3 are misplaced relative to the hinge mechanism 1. Based on a fixed connection relationship between the first housing 2 and the first housing fastening bracket 1013 and a fixed connection relationship between the second housing 3 and the second housing fastening bracket 1014, when positions of the first housing 2 and the second housing 3 are limited, a risk that the first housing fastening bracket 1013 and the second housing fastening bracket 1014 are misplaced can also be reduced.

In another embodiment, a fitting relationship opposite to that in the foregoing embodiments may also be used between the first support part 1031 and the third support part 1033, and between the second support part 1032 and the third support part 1033. For example, when the electronic device is in the unfolded state, the first protrusion 10311 of the first support part 1031 is limited in the third groove 10332 of the third support part 1033, and the second protrusion 10321 of the second support part 1032 is limited in the fourth groove 10334 of the third support part 1033, and when the electronic device is in the closed state, the third protrusion 10331 of the third support part 1033 is limited in the first groove 10312 of the first support part 1031, and the fourth protrusion 10333 of the third support part 1033 is limited in the second groove 10322 of the second support part 1032. This design can also limit positions of the first housing 2, the first housing fastening bracket 1013, the second housing 3, and the second housing fastening bracket 1014. Details are not described herein again.

In addition, in this embodiment of this disclosure, the first support part 1031 and the first housing 2 may be of an integrated structure, that is, the first support part 1031 may be directly formed at an end part of the first housing 2. This can improve strength of a connection between the first support part 1031 and the second housing 3, and reduce assembly difficulty of the electronic device. Certainly, in some other embodiments, the first support part 1031 may alternatively be fastened to the first housing 2 through welding, bonding, or the like. This split design can help reduce processing difficulty of the first support part 1031 and the first housing 2.

Similarly, the second support part 1032 and the second housing 3 may use an integrated design, or may use a split design, and the third support part 1033 and the base 1021 may use an integrated design, or may use a split design.

Similar to the foregoing embodiments, in this embodiment, there may be two first support parts 1031, two second support parts 1032, and two third support parts 1033. The two first support parts 1031 may be respectively disposed at two ends of the first housing 2 in the axial direction of the hinge mechanism 1, the two second support parts 1032 may be respectively disposed at two ends of the second housing 3 in the axial direction of the hinge mechanism 1, and the two third support parts 1033 may be respectively disposed at two ends of the base 1021 in the axial direction of the hinge mechanism 1. In this way, the support assembly 103 can limit the first housing 2 and the second housing 3 at both ends of the hinge mechanism 1. This can further reduce a risk that the first housing 2 and the first housing fastening bracket 1013, and the second housing 3 and the second housing fastening bracket 1014 are misplaced relative to the base, and improve structural reliability of the electronic device in a scenario such as falling or collision.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A hinge mechanism comprising:
- a main shaft assembly comprising:
  - a first side;
  - a second side; and
  - a first end part;
- a first housing fastening bracket disposed on the first side, configured to rotate relative to the main shaft assembly, and comprising:
  - a second end part; and
  - a third side proximate to the main shaft assembly;
- a second housing fastening bracket disposed on the second side, configured to rotate relative to the main shaft assembly, and comprising:
  - a third end part; and
  - a fourth side proximate to the main shaft assembly; and
- a support assembly comprising:
  - a first support part disposed at the second end part in an axial direction of the hinge mechanism, located on the third side, and comprising a first protrusion and a first groove;
  - a second support part disposed at the third end part in the axial direction, located on the fourth side, and comprising a second protrusion and a second groove; and
  - a third support part disposed at the first end part in the axial direction and comprising:
    - a fifth side proximate to the first housing fastening bracket;
    - a sixth side proximate to the second housing fastening bracket;
    - a third protrusion and a third groove that are disposed on the fifth side; and
    - a fourth protrusion and a fourth groove that are disposed on the sixth side,
    - wherein when the hinge mechanism is in an unfolded state, the third protrusion is configured to be limited in the first groove and the fourth protrusion is configured to be limited in the second groove, or the first protrusion is configured to be limited in the third groove and the second protrusion is configured to be limited in the fourth groove, and
    - wherein when the hinge mechanism is in a closed state, the first protrusion is configured to be limited in the third groove and the second protrusion is configured to be limited in the fourth groove, or the third protrusion is configured to be limited in the first groove and the fourth protrusion is configured to be limited in the second groove.

2. The hinge mechanism of claim 1, wherein a first projection of the third support part on a first plane covers a second projection of the main shaft assembly on the first plane, and wherein the first plane is perpendicular to the axial direction.

3. The hinge mechanism of claim 1, wherein the third support part further comprises:
- a main body comprising a seventh side located away from the main shaft assembly, wherein the third protrusion, the third groove, the fourth protrusion, and the fourth groove are disposed on the main body; and
- a baffle plate located on the seventh side,
- wherein when the hinge mechanism is in the unfolded state and the closed state, a first projection of the baffle plate on a first plane is configured to cover a first part of a second projection of the first support part on the first plane and a second part of a third projection of the second support part on the first plane, and the first plane is configured to be perpendicular to the axial direction.

4. The hinge mechanism of claim 1, wherein the first groove comprises a first groove wall comprising a first concave curved surface, wherein the third protrusion comprises a first surface, wherein the first surface comprises a first convex curved surface having a first shape consistent with that of the first concave curved surface, wherein the second groove comprises a second groove wall comprising a second concave curved surface, wherein the fourth protrusion comprises a second surface, and wherein the second surface comprises a second convex curved surface having a second shape consistent with that of the second concave curved surface.

5. The hinge mechanism of claim 4, wherein the main shaft assembly further comprises a support surface configured to support a flexible display of an electronic device, wherein the first concave curved surface comprises a first inclined surface, wherein the first convex curved surface comprises a third inclined surface, wherein in a first direction that points from the third protrusion to the fourth protrusion, the third inclined surface is configured to gradually tilt in a second direction away from the support surface, wherein the second concave curved surface comprises a second inclined surface, wherein the second convex curved surface comprises a fourth inclined surface, wherein in a third direction that points from the fourth protrusion to the third protrusion, the fourth inclined surface is configured to gradually tilt in a fourth direction away from the support surface, and wherein when the hinge mechanism is in the unfolded state, the third inclined surface is configured to be parallel to and abutting the first inclined surface, and the fourth inclined surface is configured to be parallel to and abutting the second inclined surface.

6. The hinge mechanism of claim 1, wherein the third groove comprises a first groove wall comprising a first concave curved surface, wherein the first protrusion comprises a first surface, wherein the first surface comprises a first convex curved surface having a first shape consistent with that of the first concave curved surface, wherein the fourth groove comprises a second groove wall comprising a second concave curved surface, wherein the second protrusion comprises a second surface, and wherein the second surface comprises a second convex curved surface having a second shape consistent with that of the second concave curved surface.

7. The hinge mechanism of claim 6, wherein the main shaft assembly further comprises a support surface configured to support a flexible display of an electronic device, wherein the first convex curved surface comprises a first inclined surface, wherein the first concave curved surface comprises a third inclined surface, wherein in a first direction that points from the third groove to the fourth groove, the third inclined surface is configured to gradually tilt in a second direction proximate to the support surface, wherein the second convex curved surface comprises a second inclined surface, wherein the second concave curved surface comprises a fourth inclined surface, wherein in a third direction that points from the fourth groove to the third groove, the fourth inclined surface is configured to gradually tilt in a fourth direction proximate to the support surface, and wherein when the hinge mechanism is in the closed state, the first inclined surface is configured to be parallel to and abutting the third inclined surface, and the second inclined surface is configured to be parallel to and abutting the fourth inclined surface.

8. The hinge mechanism of claim 1, wherein the third protrusion comprises a first surface, wherein the third groove comprises a first groove wall coupled to the first surface through a first connection arc-shaped surface, wherein the fourth protrusion comprises a second surface, and wherein the fourth groove comprises a second groove wall coupled to the second surface through a second connection arc-shaped surface.

9. The hinge mechanism of claim 1, wherein the first support part and the first housing fastening bracket are of a first integrated structure, wherein the second support part and the second housing fastening bracket are of a second integrated structure, or wherein the third support part and the main shaft assembly are of a third integrated structure.

10. The hinge mechanism of claim 1, further comprising:
- two first support parts respectively disposed at two ends of the first housing fastening bracket in the axial direction;
- two second support parts respectively disposed at two ends of the second housing fastening bracket in the axial direction; and
- two third support parts respectively disposed at two ends of the main shaft assembly in the axial direction.

11. The hinge mechanism of claim 1, further comprising a rotating system, wherein the first housing fastening bracket and the second housing fastening bracket separately are configured to rotate relative to the main shaft assembly through the rotating system.

12. The hinge mechanism of claim 11, wherein the main shaft assembly further comprises:
- a first track slot; and
- a second track slot,
- wherein the rotating system comprises:
  - a first rotating assembly located between the first housing fastening bracket and the second housing fastening bracket and comprising:
    - a first swing arm configured to rotatably couple to the main shaft assembly and slidably couple to the first housing fastening bracket;
    - a first support arm configured to rotatably couple to the first housing fastening bracket; and
    - a first connector located between the first swing arm and the first support arm and configured to rotatably couple to both the first swing arm and the first support arm and move along the first track slot to limit a first movement track of the first connector using the first track slot; and
  - a second rotating assembly located between the first housing fastening bracket and the second housing fastening bracket and comprising:
    - a second swing arm configured to rotatably couple to the main shaft assembly and slidably couple to the second housing fastening bracket;
    - a second support arm configured to rotatably couple to the second housing fastening bracket; and
    - a second connector located between the second swing arm and the second support arm and configured to rotatably couple to both the second swing arm and the second support arm and move along the second track slot to limit a second movement track of the second connector using the second track slot.

13. An electronic device comprising:
- a hinge mechanism comprising:
  - a main shaft assembly comprising:
    - a first side;
    - a second side; and
    - a first end part;
  - a first housing fastening bracket disposed on the first side, configured to rotate relative to the main shaft assembly, and comprising:
    - a second end part; and
    - a third side proximate to the main shaft assembly;
  - a second housing fastening bracket disposed on the second side, configured to rotate relative to the main shaft assembly, and comprising:
    - a third end part; and
    - a fourth side proximate to the main shaft assembly; and a support assembly comprising:

a first support part disposed at the second end part in an axial direction of the hinge mechanism, located on the third side, and comprising a first protrusion and a first groove;

a second support part disposed at the third end part in the axial direction, located on the fourth side, and comprising a second protrusion and a second groove; and a third support part disposed at the first end part in the axial direction and comprising:

a fifth side proximate to the first housing fastening bracket;

a sixth side proximate to the second housing fastening bracket;

a third protrusion and a third groove that are disposed on the fifth side; and a fourth protrusion and a fourth groove that are disposed on the sixth side, wherein when the hinge mechanism is in an unfolded state, the third protrusion is configured to be limited in the first groove and the fourth protrusion is configured to be limited in the second groove, or the first protrusion is configured to be limited in the third groove and the second protrusion is configured to be limited in the fourth groove, and wherein when the hinge mechanism is in a closed state, the first protrusion is configured to be limited in the third groove and the second protrusion is configured to be limited in the fourth groove, or the third protrusion is configured to be limited in the first groove and the fourth protrusion is configured to be limited in the second groove;

a first housing fastened to the first housing fastening bracket;

a second housing fastened to the second housing fastening bracket, wherein the first housing and the second housing are respectively disposed on two sides of the hinge mechanism; and a flexible display configured to continuously cover the first housing, the second housing, and the hinge mechanism and fastened to the first housing and the second housing.

14. The electronic device of claim 13, wherein a first projection of the third support part on a first plane covers a second projection of the main shaft assembly on the first plane, and wherein the first plane is perpendicular to the axial direction.

15. The electronic device of claim 13, wherein the third support part further comprises:

a main body comprising a seventh side located away from the main shaft assembly, wherein the third protrusion, the third groove, the fourth protrusion, and the fourth groove are disposed on the main body; and a baffle plate located on the seventh side, wherein when the hinge mechanism is in the unfolded state and the closed state, a first projection of the baffle plate on a first plane is configured to cover a first part of a second projection of the first support part on the first plane and a second part of a third projection of the second support part on the first plane, and wherein the first plane is configured to be perpendicular to the axial direction.

16. The electronic device of claim 13, wherein the first groove comprises a first groove wall comprising a first concave curved surface, wherein the third protrusion comprises a first surface, wherein the first surface comprises a first convex curved surface having a first shape consistent with that of the first concave curved surface, wherein the second groove comprises a second groove wall comprising a second concave curved surface, wherein the fourth protrusion comprises a second surface, and wherein the second surface comprises a second convex curved surface having a second shape consistent with that of the second concave curved surface.

17. The electronic device of claim 16, wherein the main shaft assembly further comprises a support surface configured to support the flexible display, wherein the first concave curved surface comprises a first inclined surface, wherein the first convex curved surface comprises a third inclined surface, wherein in a first direction that points from the third protrusion to the fourth protrusion, the third inclined surface is configured to gradually tilt in a second direction away from the support surface, wherein the second concave curved surface comprises a second inclined surface, wherein the second convex curved surface comprises a fourth inclined surface, wherein in a third direction that points from the fourth protrusion to the third protrusion, the fourth inclined surface is configured to gradually tilt in a fourth direction away from the support surface, and wherein when the hinge mechanism is in the unfolded state, the third inclined surface is configured to be parallel to and abutting the first inclined surface, and the fourth inclined surface is configured to be parallel to and abutting the second inclined surface.

18. The electronic device of claim 13, wherein the third groove comprises a first groove wall comprising a first concave curved surface, wherein the first protrusion comprises a first surface, wherein the first surface comprises a first convex curved surface having a first shape consistent with that of the first concave curved surface, wherein the fourth groove comprises a second groove wall comprising a second concave curved surface, wherein the second protrusion comprises a second surface, wherein the second surface comprises a second convex curved surface having a second shape consistent with that of the second concave curved surface.

19. The electronic device of claim 18, wherein the main shaft assembly further comprises a support surface configured to support the flexible display, wherein the first convex curved surface comprises a first inclined surface, wherein the first concave curved surface comprises a third inclined surface, wherein in a first direction that points from the third groove to the fourth groove, the third inclined surface is configured to gradually tilt in a second direction proximate to the support surface, wherein the second convex curved surface comprises a second inclined surface, wherein the second concave curved surface comprises a fourth inclined surface, wherein in a third direction that points from the fourth groove to the third groove, the fourth inclined surface is configured to gradually tilt in a fourth direction proximate to the support surface, and wherein when the hinge mechanism is in the closed state, the first inclined surface is configured to be parallel to and abutting the third inclined surface, and the second inclined surface is configured to be parallel to and abutting the fourth inclined surface.

20. An electronic device, comprising:

a first housing comprising a first end part and a third side;

a second housing comprising a second end part and a fourth side;

a hinge mechanism comprising:

a main shaft assembly comprising:

a first side;

a second side; and a third end part, wherein the third side and the fourth side are proximate to the main shaft assembly;

a first housing fastening bracket disposed on the first side, configured to rotate relative to the main shaft assembly, and fastened to the first housing;

a second housing fastening bracket disposed on the second side, configured to rotate relative to the main shaft assembly, and fastened to the second housing; and a support assembly comprising:

a first support part disposed at the first end part in an axial direction of the hinge mechanism, located on the third side, and comprising a first protrusion and a first groove;

a second support part disposed at the second end part in the axial direction, located on the fourth side, and comprising a second protrusion and a second groove; and a third support part disposed at the third end part in the axial direction and comprising:

a fifth side proximate to the first housing;

a sixth side proximate to the second housing;

a third protrusion and a third groove that are disposed on the fifth side; and a fourth protrusion and a fourth groove that are disposed on the sixth side, wherein when the hinge mechanism is in an unfolded state, the third protrusion is configured to be limited in the first groove and the fourth protrusion is configured to be limited in the second groove, or the first protrusion is configured to be limited in the third groove and the second protrusion is configured to be limited in the fourth groove, and wherein when the hinge mechanism is in a closed state, the first protrusion is configured to be limited in the third groove and the second protrusion is configured to be limited in the fourth groove, or the third protrusion is configured to be limited in the first groove and the fourth protrusion is configured to be limited in the second groove.

* * * * *